(12) United States Patent
Homma

(10) Patent No.: US 8,441,659 B2
(45) Date of Patent: May 14, 2013

(54) EXECUTION OF FUNCTION-RESTRICTED PROCESS FLOW

(75) Inventor: Takayuki Homma, Tokyo (JP)

(73) Assignee: Canon Kabushiki Kaisha (JP)

( * ) Notice: Subject to any disclaimer, the term of this patent is extended or adjusted under 35 U.S.C. 154(b) by 455 days.

(21) Appl. No.: 12/726,376

(22) Filed: Mar. 18, 2010

(65) Prior Publication Data

US 2010/0238481 A1    Sep. 23, 2010

(30) Foreign Application Priority Data

Mar. 18, 2009    (JP) .................................. 2009-066187

(51) Int. Cl.
*G06F 15/00*    (2006.01)
*G06K 1/00*    (2006.01)
*G06K 15/00*    (2006.01)

(52) U.S. Cl.
USPC ......................................... 358/1.14; 358/1.15

(58) Field of Classification Search .................... None
See application file for complete search history.

(56) References Cited

U.S. PATENT DOCUMENTS

| | | | |
|---|---|---|---|
| 2007/0206216 A1* | 9/2007 | Sakagami et al. | 358/1.15 |
| 2008/0007758 A1* | 1/2008 | Miyashita | 358/1.14 |
| 2010/0182639 A1* | 7/2010 | Sakai | 358/1.15 |

FOREIGN PATENT DOCUMENTS

| | | |
|---|---|---|
| JP | 2005-301602 A | 10/2005 |
| JP | 2008-003810 A | 1/2008 |
| JP | 2008-211747 A | 9/2008 |

OTHER PUBLICATIONS

JP Office Action issued Mar. 5, 2013 for corresponding JP 2009-066187.

* cited by examiner

*Primary Examiner* — Douglas Tran
(74) *Attorney, Agent, or Firm* — Rossi, Kimms & McDowell LLP

(57) ABSTRACT

An image processing apparatus that enables a user who is restricted in use of a function to use the restricted function easily and exactly only for a specific process flow. A function restriction unit restricts execution of a function of the image processing apparatus based on restriction information set for every user. A process-flow generation unit generates a process that is achieved by combining a plurality of functions as a process flow according to an instruction from a user. An authentication unit authenticates the user according to his user account. A storage unit stores a process flow that is generated by the process-flow generation unit according to an instruction from an authenticated first user as a process flow on which a second user who is restricted in use of at least one of functions included in the process flow can issue an execution instruction to an execution unit.

8 Claims, 24 Drawing Sheets

EXECUTION OF FUNCTION-RESTRICTED PROCESS FLOW

BACKGROUND OF THE INVENTION

1. Field of the Invention

The present invention relates to an image processing apparatus such as a copier, a control method therefor, and a storage medium storing a control program to execute the control method.

2. Description of the Related Art

A conventional document management system has a technique of restricting access to a document. The technique can manage a security rule that defines what kind of operations are permitted for every user using an ACL (Access Control List) for every document or for every group that consists of a plurality of documents.

For example, a document management system disclosed in Japanese laid-open patent publication (Kokai) No. 2005-301602 (JP2005-301602A) is provided with an operation approval/disapproval determination function to determine approval/disapproval of various operations with respect to user's documents based on security information (access restriction information) that is information about security for the documents. An approval/disapproval determination rule, which defines whether an operation is permitted to a user, is defined based on a combination of a classification of a document to be operated and the user who operates the document. Authority of a document management operation by the user is controlled by using the rule.

However, the technique of the publication mentioned above requires the user to apply to an administrator of the ACL for changing the access restriction information, when changing the access restriction information. As a result, the access restriction information cannot be changed rapidly, and therefore, if an access right is temporarily given to a person by changing the access restriction information, the person can work with the access right until the access restriction information is changed again. Therefore, there was a security problem.

Since the access right is linked to a user, the access right specified to a certain routine task was not able to give to another user. For example, since a task that is performed by the user who has the access right cannot be transferred to another user who does not have the access right, it was inconvenience.

SUMMARY OF THE INVENTION

The present invention provides an image processing apparatus, a control method therefor, and a storage medium storing a control program to execute the control method, which allows a user who is restricted in use of a function to use the restricted function easily and exactly only for a specific process flow.

Accordingly, a first aspect of the present invention provides an image processing apparatus having a plurality of functions comprising a function restriction unit adapted to restrict execution of a function of the image processing apparatus based on restriction information for restricting use of the function of the image processing apparatus, the restriction information being set for every user, a process-flow generation unit adapted to generate a process that is achieved by combining a plurality of functions provided by the image processing apparatus as a process flow according to an instruction from a user, an execution unit adapted to execute the process flow based on an instruction from the user, an authentication unit adapted to authenticate the user who operates the image processing apparatus according to a user account of the user concerned, and a storage unit adapted to store a process flow that is generated by the process-flow generation unit according to an instruction from a first user who is authenticated by the authentication unit as a process flow on which a second user who is restricted in use of at least one of functions included in the process flow by the function restriction unit can issue an execution instruction to the execution unit.

Accordingly, a second aspect of the present invention provides a control method for an image processing apparatus that has a plurality of functions and is provided with a function restriction unit to restrict execution of a function of the image processing apparatus based on restriction information, which is set for each user, for restricting use of the function of the image processing apparatus, the control method comprising an authentication step of authenticating a first user who operates the image processing apparatus according to a user account of the first user, a process-flow generation step of generating a process that is achieved by combining a plurality of functions provided by the image processing apparatus as a process flow according to an instruction from the first user, and a storage step of storing a process flow that is generated in the process-flow generation step as a process flow on which a second user who is restricted in use of at least one of functions included in the process flow by the function restriction unit can issue an execution instruction.

Accordingly, a third aspect of the present invention provides a storage medium storing a control program causing a computer to execute a control method for an image processing apparatus that has a plurality of functions and is provided with a function restriction unit to restrict execution of a function of the image processing apparatus based on restriction information, which is set for each user, for restricting use of the function of the image processing apparatus, the control method comprising an authentication step of authenticating a first user who operates the image processing apparatus according to a user account of the first user, a process-flow generation step of generating a process that is achieved by combining a plurality of functions provided by the image processing apparatus as a process flow according to an instruction from the first user, and a storage step of storing a process flow that is generated in the process-flow generation step as a process flow on which a second user who is restricted in use of at least one of functions included in the process flow by the function restriction unit can issue an execution instruction into a storage unit.

According to the present invention, even if the user is restricted in use of the function, the user can use the restricted function easily and exactly only for the specific process flow. Therefore, even if an access to the image processing apparatus is restricted, a task can be transferred easily, which improves user's convenience.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
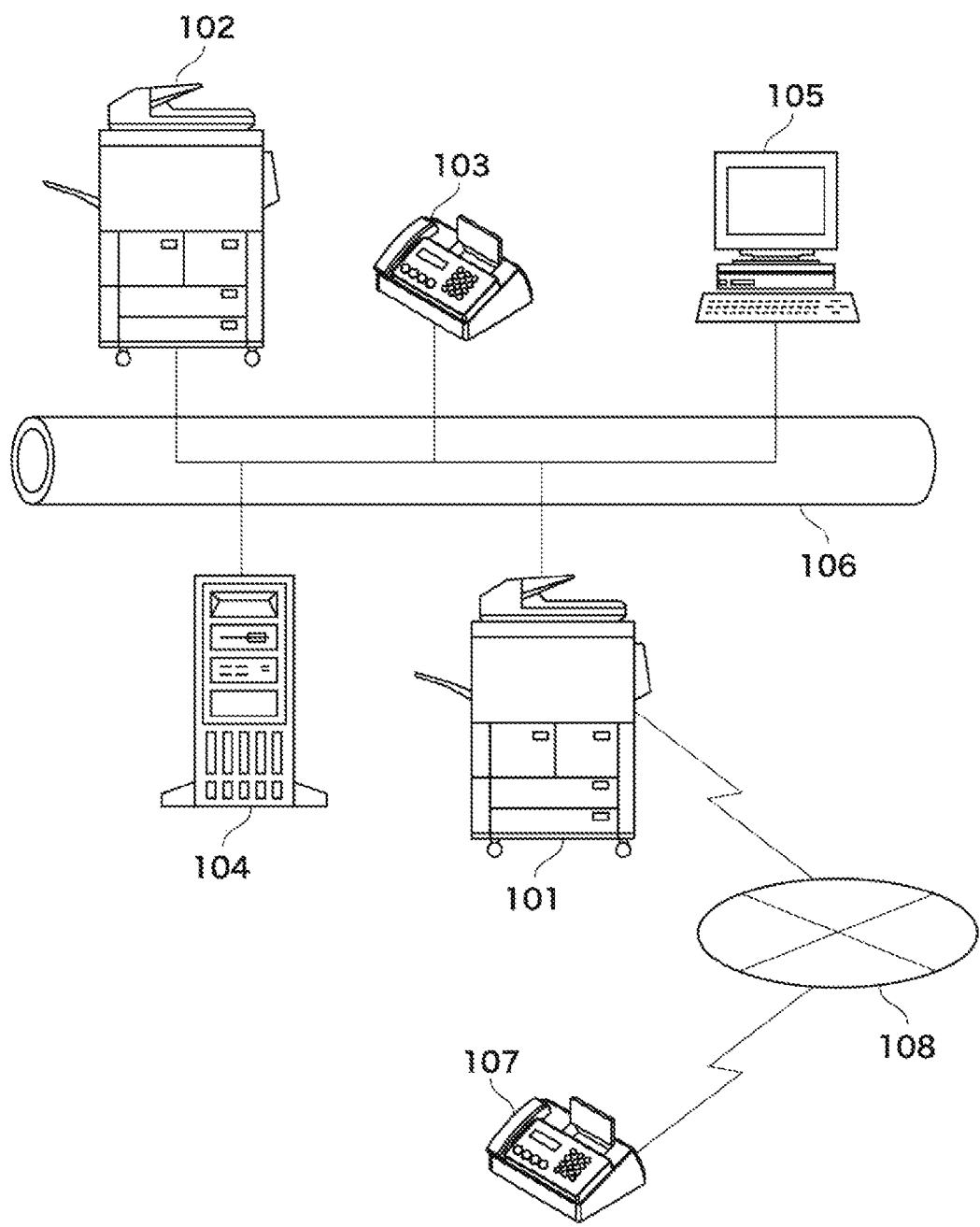
FIG. 1 is a schematic view showing a configuration of a network that accommodates a multifunctional peripheral device that is an example of the image processing apparatus according to a first embodiment of the present invention.

FIG. 1 is a schematic view showing a configuration of a network that accommodates a multifunctional peripheral device that is an example of the image processing apparatus according to a first embodiment of the present invention.

The multifunctional peripheral device in this embodiment is a copier that has a data transmitting/receiving function, for example. As shown in FIG. 1, a LAN 106 that is the Ethernet (registered trademark) etc. accommodates a first copier 101, a second copier 102 having a function equivalent to the first copier 101, a facsimile machine 103, a database/mail server 104, and a client computer 105. A public line 108 accommodates the first copier 101 and a facsimile machine 107.

The first copier 101 has a copy function, a facsimile function, and a data transmitting function that reads an original image and transmits image data acquired by reading to the devices on the LAN 106.

Since the first copier 101 has a PDL (Page Description Language) function, it can receive and print a PDL image directed by the computer 105 that is connected to the LAN 106. The first copier 101 can store the image read by itself and the PDL image directed by the computer 105 that is connected to the LAN 106 into a directed box area in a HDD (a hard disk drive) 204 (see FIG. 2) in the first copier 101. The first copier 101 can print the image stored in the box area.

The first copier 101 can receive data read by the second copier 102 via the LAN 106 and can store the received data into the HDD 204 in the first copier 101 and print out it. Further, the first copier 101 can receive an image stored in the database/mail server 104 via the client computer 105 and the LAN 106, and can store the received image inside the first copier 101 and print out it.

The client computer 105 can acquire and display desired data from the database/mail server 104 by connecting to the database/mail server 104. Further, the client computer 105 can receive the data read by the first copier 101 via the LAN 106, and can process and edit the received data. Moreover, the client computer 105 can perform various settings of the first copier 101 by connecting to the first copier 101.

Figure 2:
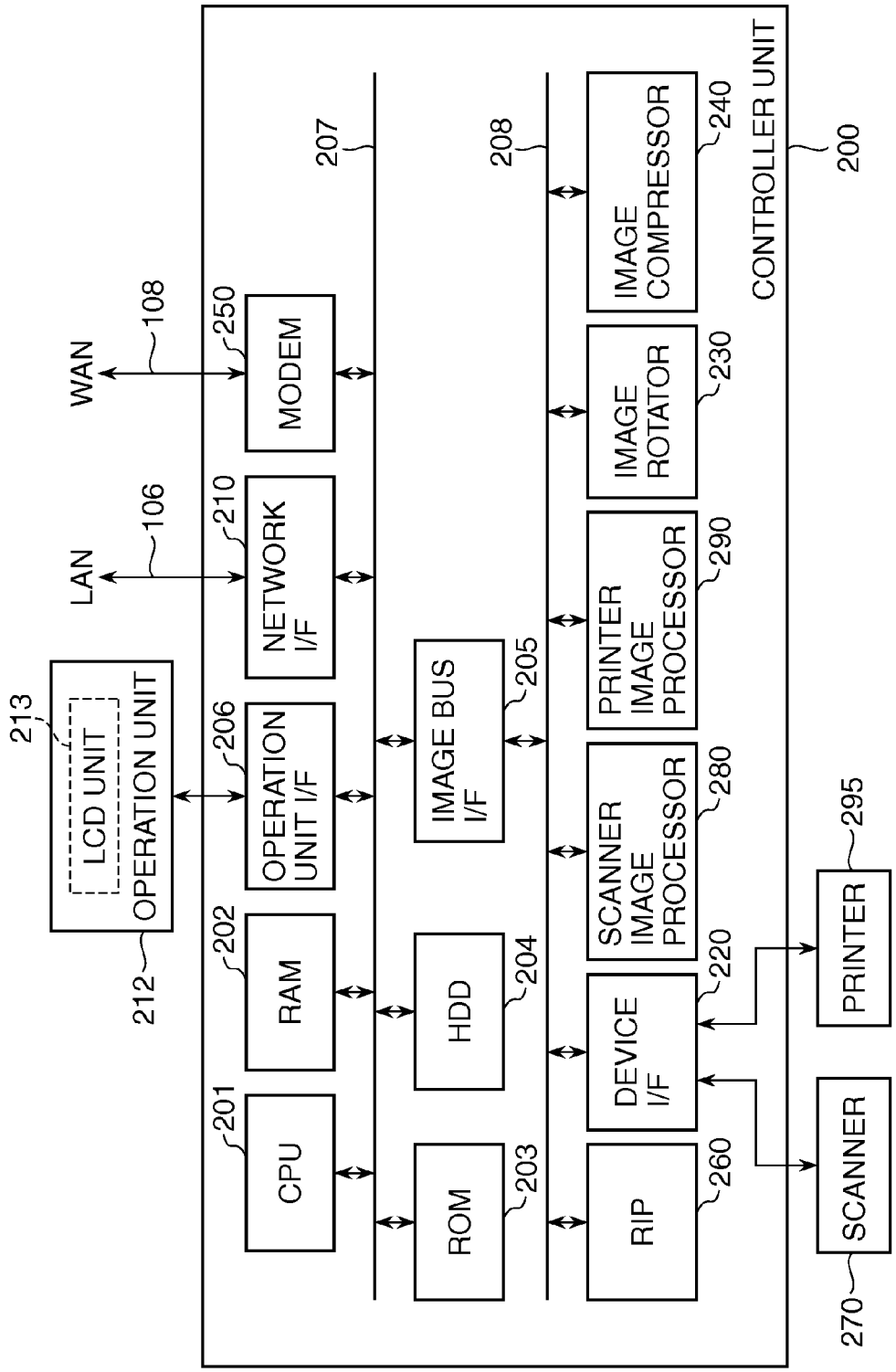
FIG. 2 is a block diagram schematically showing a configuration of a principal part of the multifunctional peripheral device in FIG. 1.

FIG. 2 is a block diagram schematically showing a configuration of a principal part of the first copier 101.

The first copier 101 includes a controller unit 200 to which a scanner 270 as an image input device, a printer 295 as an image output device, and an operation unit 212 are connected. The controller unit 200 controls the scanner 270 and the printer 295 so as to achieve the copy function to print out image data read by the scanner 270 by the printer 295. The controller unit 200 controls I/O of image information and device information by connecting with the LAN 106 and the public line 108 (WAN).

Specifically, the controller unit 200 has a CPU 201. The CPU 201 starts an operating system (OS) by a boot program stored in a ROM 203 and executes application programs stored in the HDD 204 on the OS to perform various processes. A RAM 202 is used as a working area of the CPU 201. The RAM 202 provides an image memory area to memorize image data temporarily in addition to the working area. The HDD 204 stores the above-mentioned application programs and the image data.

In addition to the ROM 203 and the RAM 202, an operation unit I/F (interface) 206, a network I/F 210, a modem 250, and an image bus I/F 205 are connected to the CPU 201 via a system bus 207.

The operation unit I/F 206 is an interface with the operation unit 212 that has an LCD unit 213 in which a touch-panel sheet is affixed on an LCD and outputs the image data that should be displayed on the operation unit 212 to the operation unit 212. The operation unit I/F 206 sends the information inputted by a user from the operation unit 212 to the CPU 201.

The network I/F 210 is connected to the LAN 106, and performs I/O of information among the apparatuses on the LAN 106 via the LAN 106. The modem 250 is connected to the public line 108, and performs I/O of information via the public line 108.

The image bus I/F 205 is a bus bridge that connects the system bus 207 with an image bus 208 that transmits image data at high speed and converts a data format. A raster image processor (referred to as "RIP", hereafter) 260, a device I/F 220, a scanner image processor 280, a printer image processor 290, an image rotator 230, and an image compressor 240 are installed on the image bus 208.

The RIP 260 is a processor that develops a PDL code to a bitmap image. The scanner 270 and the printer 295 are connected to the device I/F 220, and the device I/F 220 converts image data between a synchronous system and an asynchronous system. The scanner image processor 280 performs a correction, a processing, and an editing with respect to inputted image data. The printer image processor 290 performs a correction, a conversion of resolution, and the like with respect to print-output image data corresponding to the printer 295. The image rotator 230 converts image data to rotate the image. The image compressor 240 compresses multilevel image data into JPEG data, compresses binary image data into JBIG data, MMR data, MH data, etc., and performs a decompression process.

Next, an outline of an application program (referred to as an "application", hereafter) of this embodiment will be described.

The application of this embodiment is a program executed by the CPU 201, and is an application for increasing efficiency of a routine task that uses functions of a copier. When functions of the copier are combined as one process flow, the same setting can be repeatedly used. For example, a series of operations to read an original, to merge the original with a front cover that has been stored in the box area, and to print can be combined as one process flow.

The process flow consists of three processes including an "input process", an "edit process", and an "output process". The "input process" is a process to set up an input method of a document (image data and document data are generically called a document, hereafter) that is a process target of the process flow, and an original reading process and a box document process can be set as the input method. When the original reading process is set, an original is read using a reading configuration that is set when executing the process flow, and the read original can be selected as an input document. When the box document process is set, a document stored beforehand in the box area can be selected as an input document.

The "edit process" is a process to set up an edit method of the document selected in the input process, and a document merge process, a page elimination process, and an image display process can be set as the edit method. When the document merge process is set, the documents selected in the input process are merged in a designated order. When the page elimination process is set, a page that is designated in the document selected in the input process or the document merged in the edit process can be eliminated. When the image display process is set, the image of the document selected in the input process or the document merged in the edit process can be displayed.

The "output process" is a process to set up an output method of the document selected in the input process and the document edited in the edit process, and a store-in-box process, a transmitting process, and a printing process can be set as the output method. When the store-in-box process is set, the document selected in the input process and the document edited in the edit process can be stored in the designated box area. When the transmitting process is set, the document selected in the input process and the document edited in the edit process can be transmitted by a designated method. When the printing process is set, the document selected in the input process and the document edited in the edit process can be printed in a designated setting.

The generated process flow is stored in the HDD 204. In the application of this embodiment, the process flow is saved as an XML format file. However, the file format is not limited and a CSV format may be used, for example. In the application of this embodiment, the process flow comes to be displayed on the LCD unit 213 as a button. When detecting depression of a process flow button, the application acquires the designated process-flow file from the HDD 204 and executes processes while interpreting contents of the process flow.

Next, a program configuration of the application in this embodiment will be described with reference to FIG. 3.

Figure 3:
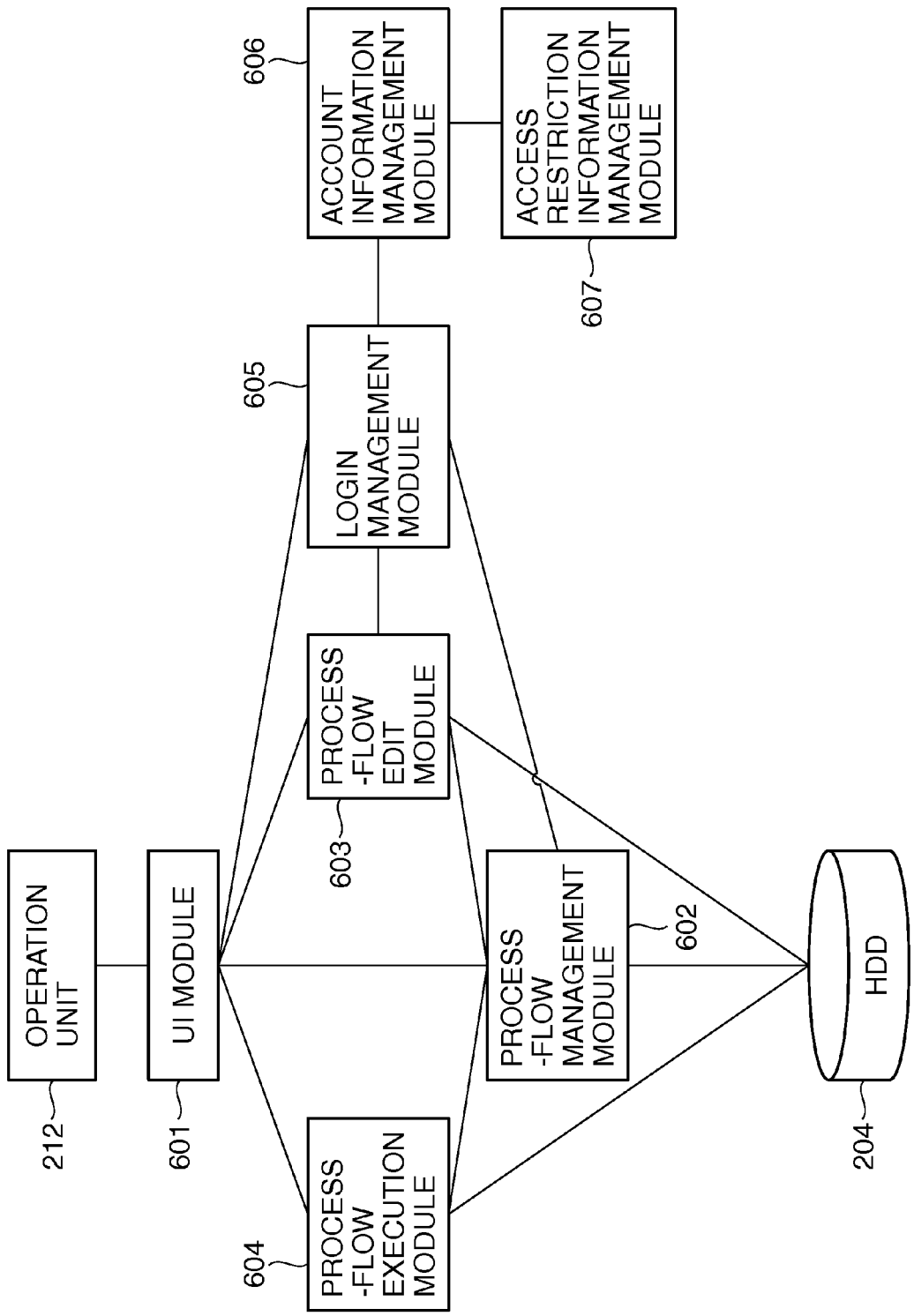
FIG. 3 is a block diagram schematically showing a configuration of an application according to the first embodiment.

FIG. 3 is a block diagram schematically showing a configuration of the application according to this embodiment. The application program shown in FIG. 3 is stored in the HDD 204.

As shown in FIG. 3, the application of this embodiment is provided with a UI module 601, a process-flow management module 602, a process-flow edit module 603, a process-flow execution module 604, a login management module 605, an account information management module 606, and an access restriction information management module 607.

The UI module 601 is a program that displays an operation screen of the application of this embodiment on the LCD unit 213 of the operation unit 212, and acquires input information from a user. The process-flow management module 602 is a program that generates/acquires a process flow file, and generates display information about a process-flow list screen and an operation setting screen. The process-flow edit module 603 is a program that manages a process-flow edit process.

The process-flow execution module 604 is a program that manages a process-flow execution process.

The login management module 605 is a program that manages a user authentication process and a registration/elimination process for a user ID. In the application in this embodiment, user authentication is performed using authentication information such as a user ID and a password. In addition, the user authentication may be performed using authentication information such as information inputted from an IC card, biological information, and a user ID and a password that are set in the process flow.

The account information management module 606 is a program that manages such as a password, a section ID, and a role linked to a user ID. The access restriction information management module 607 is a program that manages access restriction information linked to the role. Accordingly, the use of the functions of the first copier 101 can be managed for each user.

The account information management module 606 and the access restriction information management module 607 may be installed in a server, the database/mail server 104, for example, other than the image processing apparatus. In that case, the processes of the account information management module 606 and the access restriction information management module 607 are executed by a CPU on the database/mail server 104. The login management module 605 and the account information management module 606 communicate using the network I/F 210 and a network I/F (not shown) of the database/mail server 104.

First, an outline of a characteristic process in this embodiment will be described briefly.

According to the process in this embodiment, even if a user is restricted in use of a function, the user can use the restricted function easily only for a specific process flow. That is, only a process flow that is permitted (generated) by an authorized user (a first user) can be performed by a user (a second user) who does not have authority to execute the process.

Figure 4:
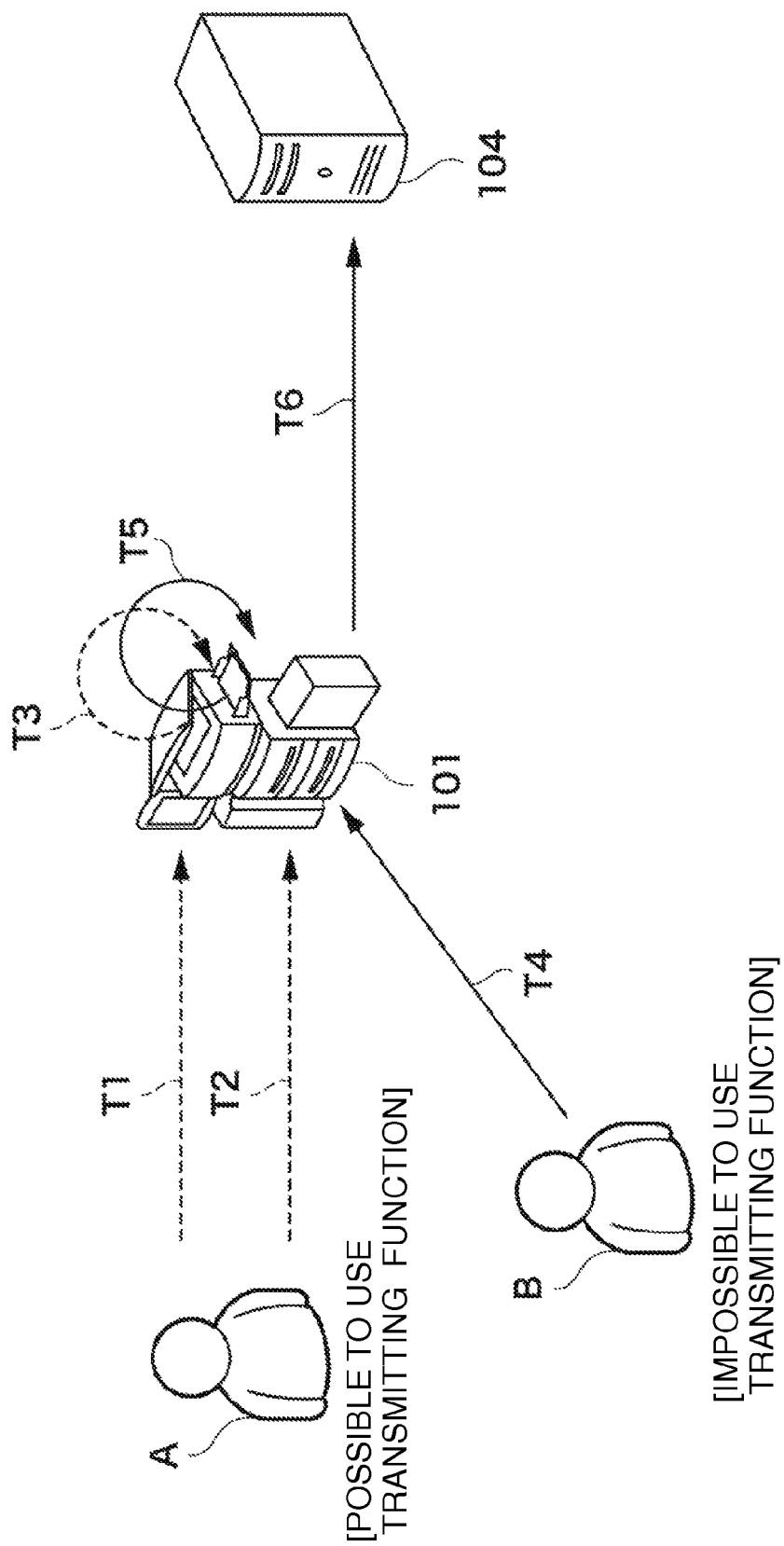
FIG. 4 is a schematic view showing a characteristic process according to the first embodiment.

A process to permit a transmitting function only for a predetermined destination to a user who cannot use a transmitting function will be described briefly with reference to FIG. 4 as an example. FIG. 4 is a schematic view showing an outline of the characteristic process according to this embodiment.

In FIG. 4, a user A can use the transmitting function, and a user B cannot use the transmitting function. For example, the user A generates a process flow to transmit a document scanned by the first copier 101 to an exclusive folder in the server 104 (T1 in FIG. 4).

Next, the user A is going to store the generated process flow as a process flow button for the user B (T2 in FIG. 4). That is, an account (a child user account) that has the same authority (transmitting function can be used) as the user A is generated, the account information is embedded in the generated process flow, and the process flow is stored (T3 in FIG. 4).

Then, the user B is going to execute the process flow generated by the user A using the first copier 101 (T4 in FIG. 4). Since the transmitting function cannot be performed by the authority of the user B, the user B relogs in with the account that can perform the transmitting function that is embedded in the process flow concerned (T5 in FIG. 4). Since the user B has re-logged in with the account (the child user account) that can perform the transmitting function, the user B can transmit the scanned document to a folder of the user A in the server 104 (T6 in FIG. 4). That is, the process flow can be executed conveniently by the authority of the child user account to use the function (transmitting is possible).

Hereafter, concrete processes of this embodiment will be described in detail with reference to figures.

First, a login process of the application according to this embodiment will be described with reference to FIG. 5 and FIG. 6.

Figure 5:
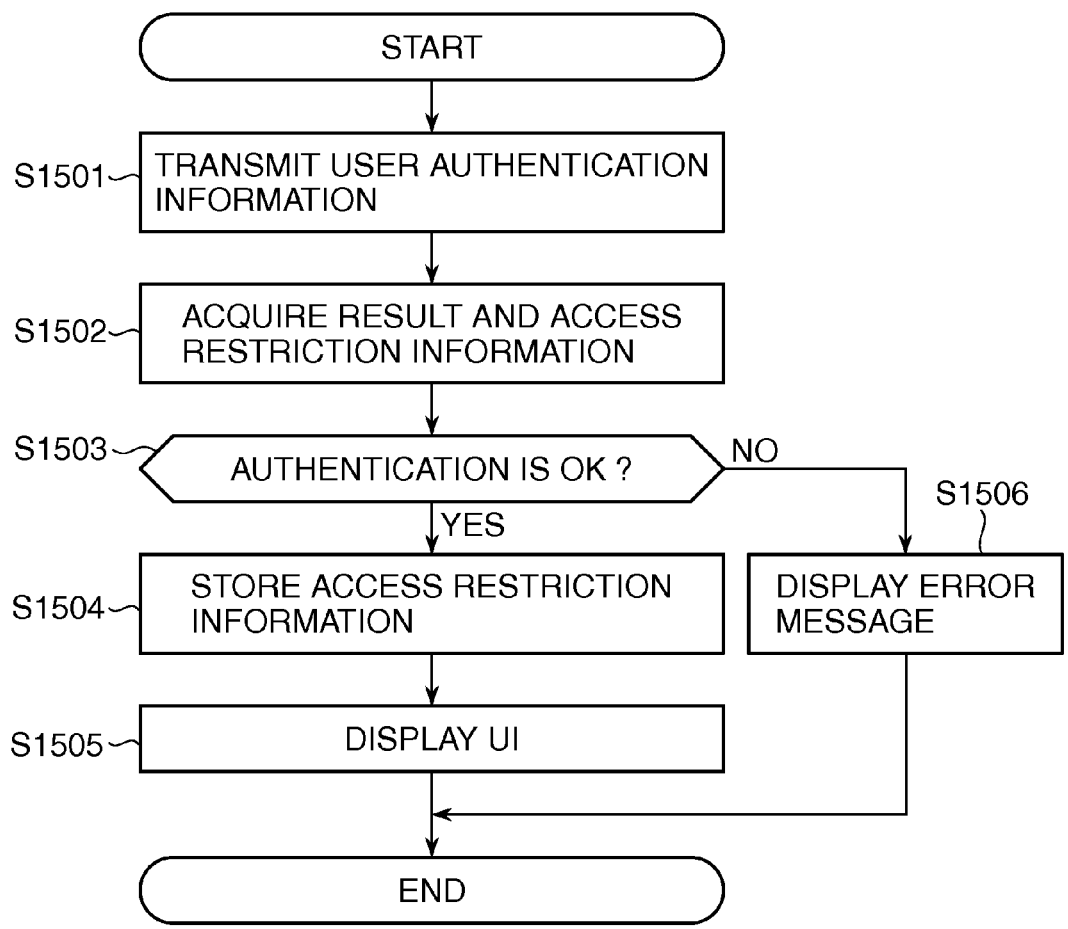
FIG. 5 is a flowchart showing a login process of the application according to the first embodiment.

FIG. 5 is a flowchart showing the login process of the application according to this embodiment. This flowchart is achieved when the CPU 201 of the multifunctional peripheral device (101, 102) executes the application program shown in FIG. 3.

In step S1501, when detecting that a user has inputted authentication information, the UI module 601 passes the authentication information to the login management module 605. In the next step S1502, the login management module 605 passes the authentication information to the account information management module 606, and acquires a result of user authentication and access restriction information about the login user.

In the step S1502, the login management module 605 queries the account information management module 606, and waits for the reply about the result of the user authentication and the access restriction information. At this time, when there is no reply from the account information management module 606 within a fixed time (No in step S1503), it is regarded as an authentication failure and the process proceeds to step S1506. When the reply is received from the account information management module 606 within the fixed time, the process proceeds to step S1504.

In the step S1504, the login management module 605 stores the access restriction information about the login user acquired from the account information management module 606 in the process-flow management module 602, and the process proceeds to step S1505.

In the step S1505, the login management module 605 notifies the UI module 601 about a success of the login, and the UI module 601 displays a UI for the login user (for example, a screen of FIG. 9 mentioned below). In the step S1506, the login management module 605 notifies the UI module 601 about a failure of the login, and the UI module 601 displays an error message.

Figure 6:
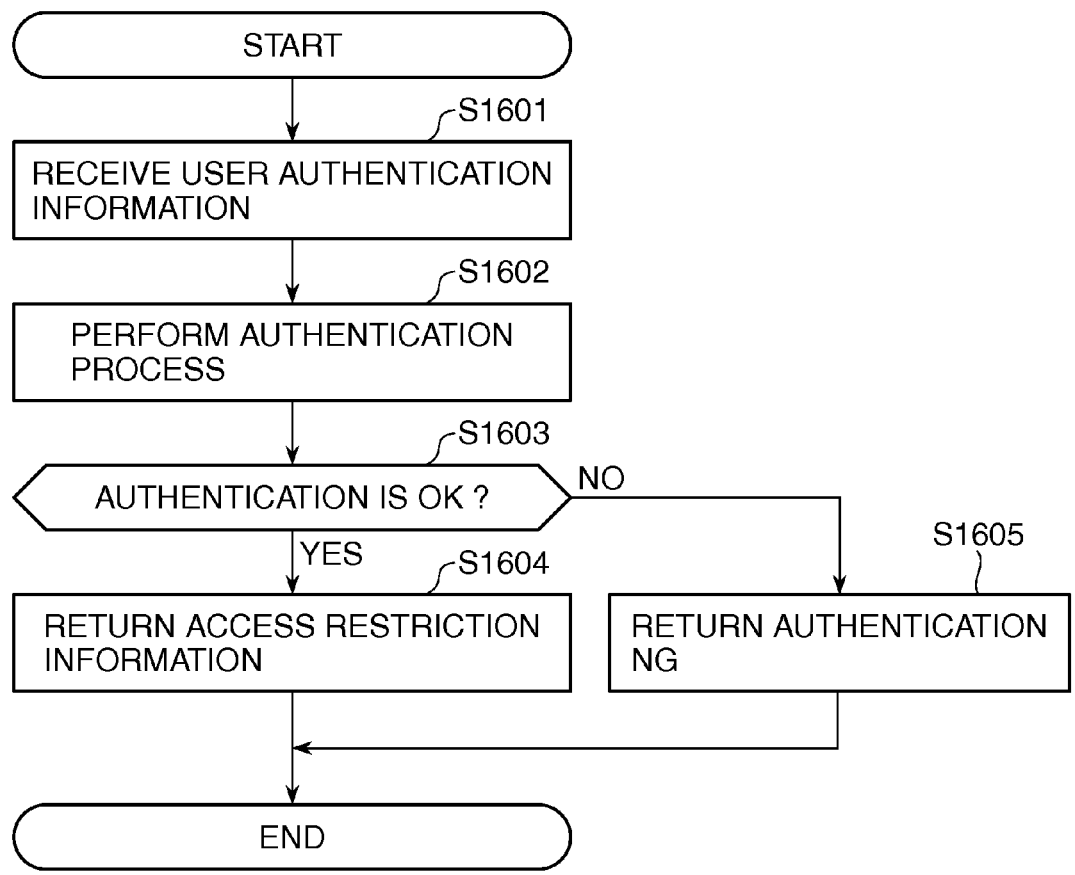
FIG. 6 is a flowchart showing an account information return process of the application according to the first embodiment.

FIG. 6 is a flowchart showing an account information return process of the application according to this embodiment.

First, in step S1601, the account information management module 606 receives the authentication information from the login management module 605, and the process proceeds to step S1602. In the step S1602, the account information management module 606 performs an authentication process by comparing the information about the user ID and the password held by the account information management module 606 to the authentication information received from the login management module 605. However, the authentication method is not limited to password comparison.

In step S1603, the result of the authentication process in the step S1602 is determined. When the authentication succeeded, the process proceeds to step S1604. When the authentication failed, the process proceeds to step S1605. In the step S1604, the account information management module 606 acquires the access restriction information linked to the role of the login user from the access restriction information management module 607, and returns it to the login management module 605. In the step S1605, the information that shows the authentication failure is returned to the login management module 605.

Next, a process-flow generation process of the application according to this embodiment will be described with reference to FIG. 7 through FIG. 14.

Figure 7:
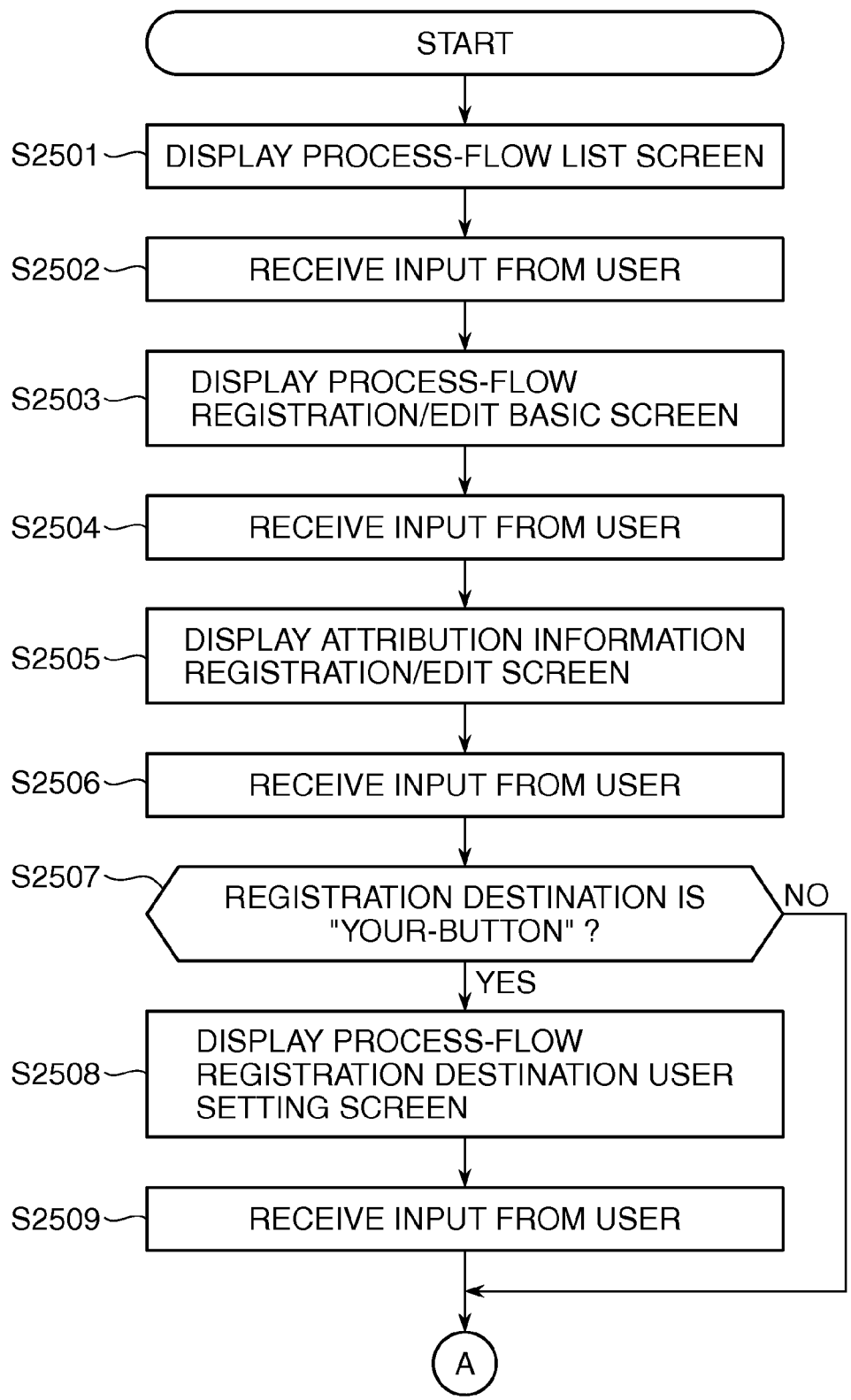
FIG. 7 is a flowchart showing a first half of a process-flow generation process of the application according to the first embodiment.
Figure 8:
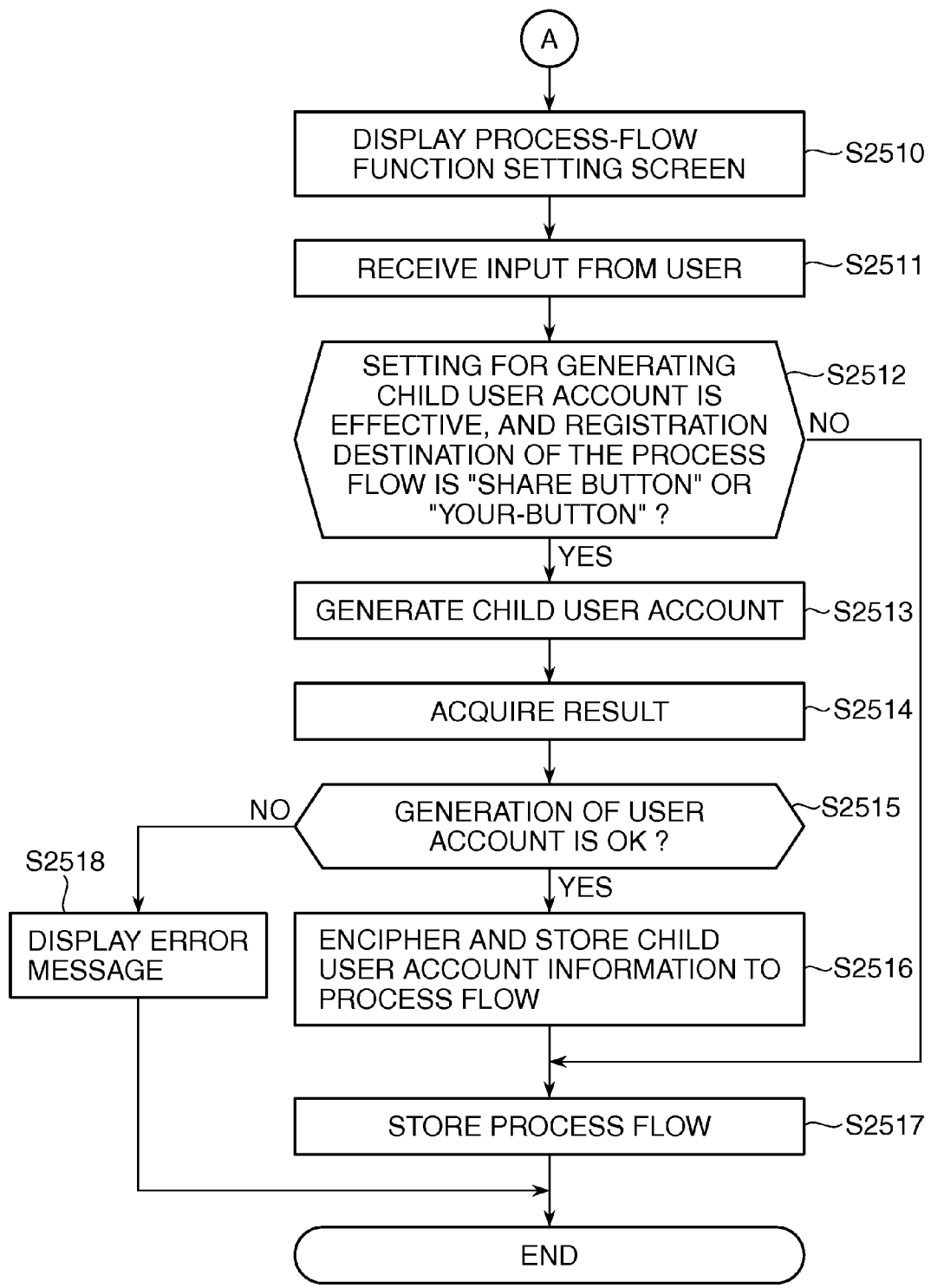
FIG. 8 is a flowchart showing a second half of the process-flow generation process of the application according to the first embodiment.

FIG. 7 and FIG. 8 are flowcharts showing the process-flow generation process of the application according to the first embodiment.

Figure 9:
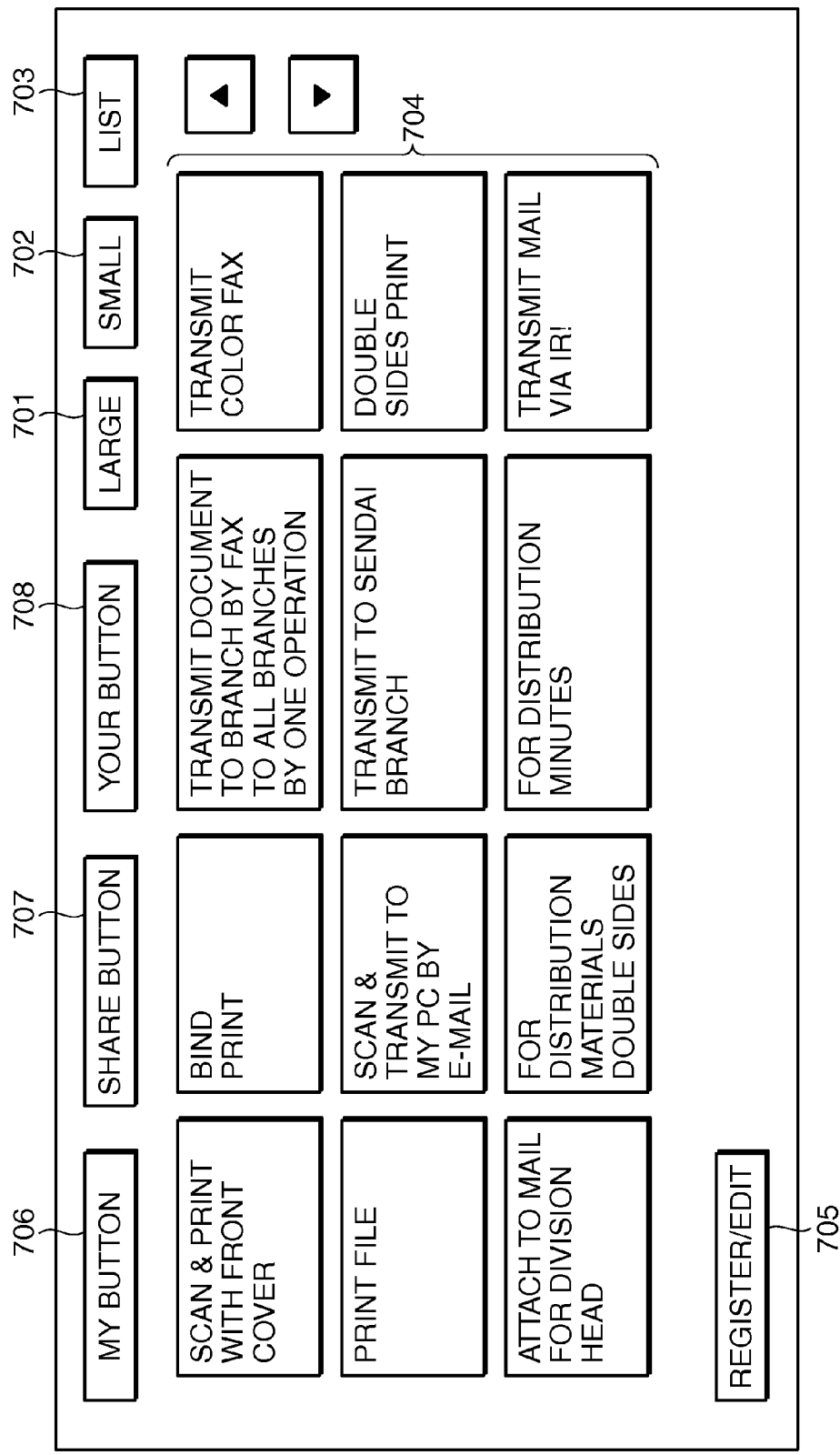
FIG. 9 is a view showing a process-flow list screen that is displayed on an LCD unit by the application according to the first embodiment.

When the login management module 605 notifies the UI module 601 about the success of the login, the UI module 601 displays a process-flow list screen shown in FIG. 9 on the LCD unit 213 in step S2501 in FIG. 7, and receives an input from the user in the next step S2502.

FIG. 9 is a view showing the process-flow list screen that is displayed on the LCD unit 213 by the application according to this embodiment.

Process flow buttons 704 represent process-flow information stored in the HDD 204 as an image of buttons.

When the UI module 601 detects that the user pushed one of the process flow buttons 704 in step S2502, the UI module 601 transmits such a notice to the process-flow management module 602. Receiving the notice, the process-flow management module 602 reads the process-flow file stored in the HDD 204 and executes a plurality of functions of a copier as set up.

A display form of the process flow buttons 704 can be selected from three patterns including a large form, a small form, and a list form in response to a selecting condition of buttons 701 through 703. During the user authentication, a my-button-indication selection button 706, a share-buttonindication selection button 707, and a your-button-indication selection button 708 are displayed.

When the UI module 601 detects that the user pushed the my-button-indication selection button 706 in the step S2502, the UI module 601 transmits such a notice to the process-flow management module 602. Receiving the notice, the process-flow management module 602 displays only secret process flow buttons that can be operated by the login user only.

When the UI module 601 detects that the user pushed the share-button-indication selection button 707 in the step S2502, the UI module 601 transmits such a notice to the process-flow management module 602. Receiving the notice, the process-flow management module 602 displays public process-flow buttons that can be operated by any user, and the process flow buttons generated under the condition where no user is authenticated.

When the UI module 601 detects that the user pushed the your-button-indication selection button 708 in the step S2502, the UI module 601 transmits such a notice to the process-flow management module 602. Receiving the notice, the process-flow management module 602 displays a process flow button that is generated by the login user and registered as a my-button of another user.

When the UI module 601 detects that the user pushed a registration/edit button 705 in the step S2502, the process proceeds to step S2503. In the step S2503, the UI module 601, which detected that the user pushed the registration/edit button 705, transmits such a notice to the process-flow management module 602. Receiving the notice, the process-flow management module 602 calls the process-flow edit module 603. The process-flow edit module 603 called by the process-flow management module 602 displays a process-flow registration/edit basic screen shown in FIG. 10. Then, the process proceeds to step S2504, and the UI module 601 receives an input from the user.

Figure 10:
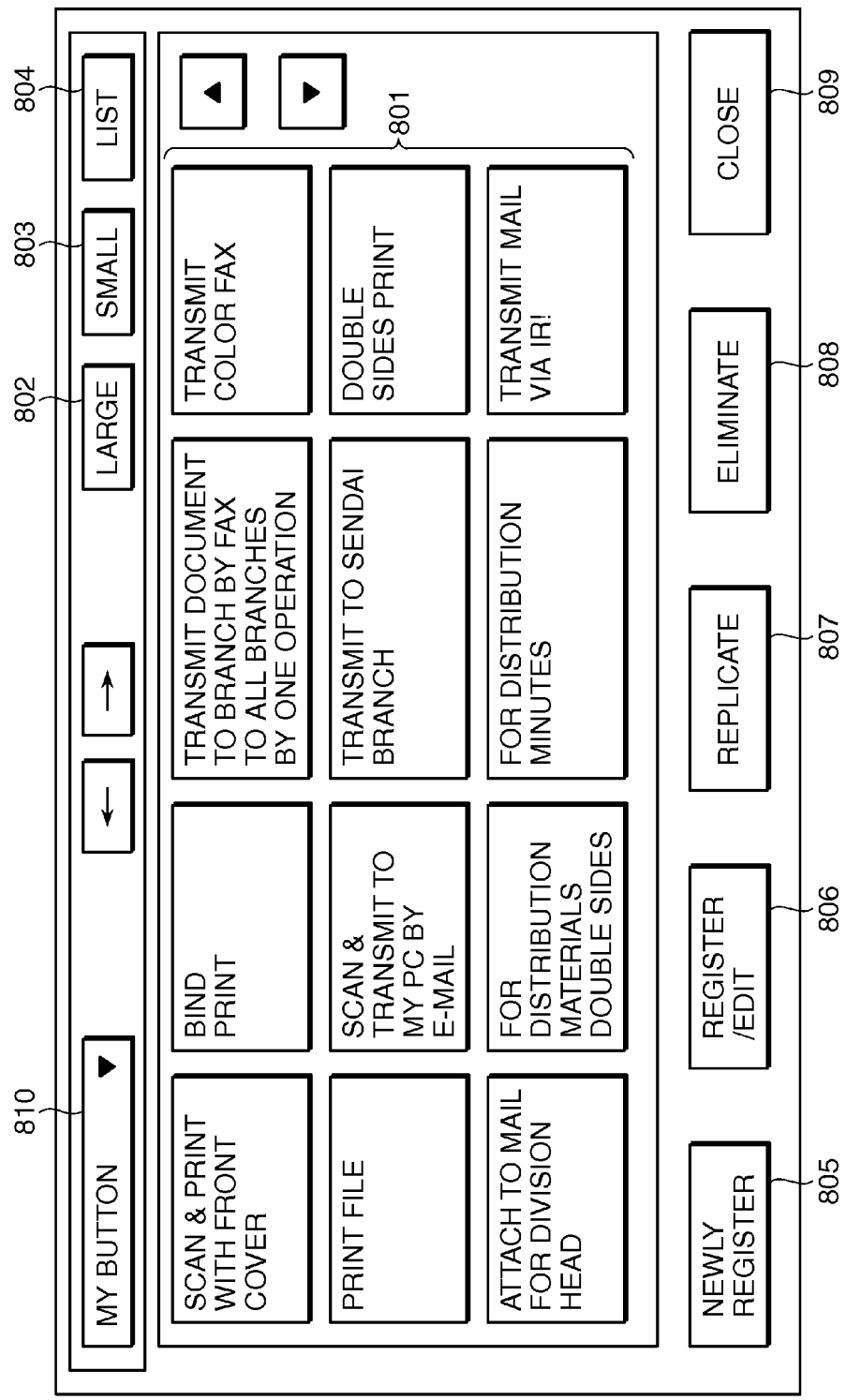
FIG. 10 is a view showing a process-flow registration/edit basic screen that is displayed on the LCD unit by the application according to the first embodiment.

FIG. 10 is a view showing the process-flow registration/edit basic screen that is displayed on the LCD unit 213 by the application according to this embodiment.

Process flow buttons 801 represent the process-flow information stored in the HDD 204 as an image of buttons. A display form of the process flow buttons 801 can be selected from three patterns including a large form, a small form, and a list form in response to a selecting condition of buttons 802 through 804.

When the UI module 601 detects that the user pushed an indication selection pull-down 810 in the step S2504, the UI module 601 transmits such a notice to the process-flow edit module 603. Receiving the notice, the process-flow edit module 603 displays a pull-down list for selecting from among a my-button indication, a share-button indication, and a your-button indication.

When the UI module 601 detects that the user selected the my-button indication in this condition, the UI module 601 transmits such a notice to the process-flow edit module 603. Receiving the notice, the process-flow edit module 603 displays only secret process flow buttons that has been generated by the login user.

When the UI module 601 detects that the user selected the share-button indication in the step S2504, the UI module 601 transmits such a notice to the process-flow edit module 603. Receiving the notice, the process-flow edit module 603 displays public process-flow buttons, which are generated by all the users, and process flow buttons generated under the condition where no user is authenticated.

When the UI module 601 detects that the user selected the your-button indication in the step S2504, the UI module 601 transmits such a notice to the process-flow edit module 603. Receiving the notice, the process-flow edit module 603 displays process flow buttons that are generated by the login user and registered as a my-button of another user.

When the UI module 601 detects that the user selected one of the process flow buttons 801 and then pushed a registration/edit button 806 or a replication button 807 in the step S2504, the UI module 601 transmits such a notice to the process-flow edit module 603. Receiving the notice, the process-flow edit module 603 reads the process-flow file stored in the HDD 204 and displays a screen shown in FIG. 11.

When the UI module 601 detects that the user selected one of the process flow buttons 801 and then pushed the replication button 807 in the step S2504, the UI module 601 transmits such a notice to the process-flow edit module 603. Receiving the notice, the process-flow edit module 603 reads the process flow file from the HDD 204 and transmits the read process flow information to the process-flow management module 602 as a new process flow. The process-flow management module 602 additionally stores the process flow information received from the process-flow edit module 603 into the HDD 204. As a result, the process flow is replicated.

When the UI module 601 detects that the user selected one of the process flow buttons 801 and then pushed an elimination button 808 in the step S2504, the UI module 601 transmits such a notice to the process-flow edit module 603. Receiving the notice, the process-flow edit module 603 transmits the notice to the process-flow management module 602 further. The process flow is eliminated when the process-flow management module 602 eliminates the process-flow information, which is received from the process-flow edit module 603, from the HDD 204.

When the UI module 601 detects that the user pushed a close button 809 in the step S2504, the UI module 601 transmits such a notice to the process-flow edit module 603. Receiving the notice, the process-flow edit module 603 displays the screen shown in FIG. 9.

When the UI module 601 detects that the user pushed a new registration button 805 in the step S2504, the process proceeds to step S2505. In the step S2505, the UI module 601 transmits a notice that the user pushed the new registration button 805 to the process-flow edit module 603. Receiving the notice, the process-flow edit module 603 displays an attribution information registration/edit screen shown in FIG. 11. Then, the UI module 601 receives an input from the user in step S2506.

Figure 11:
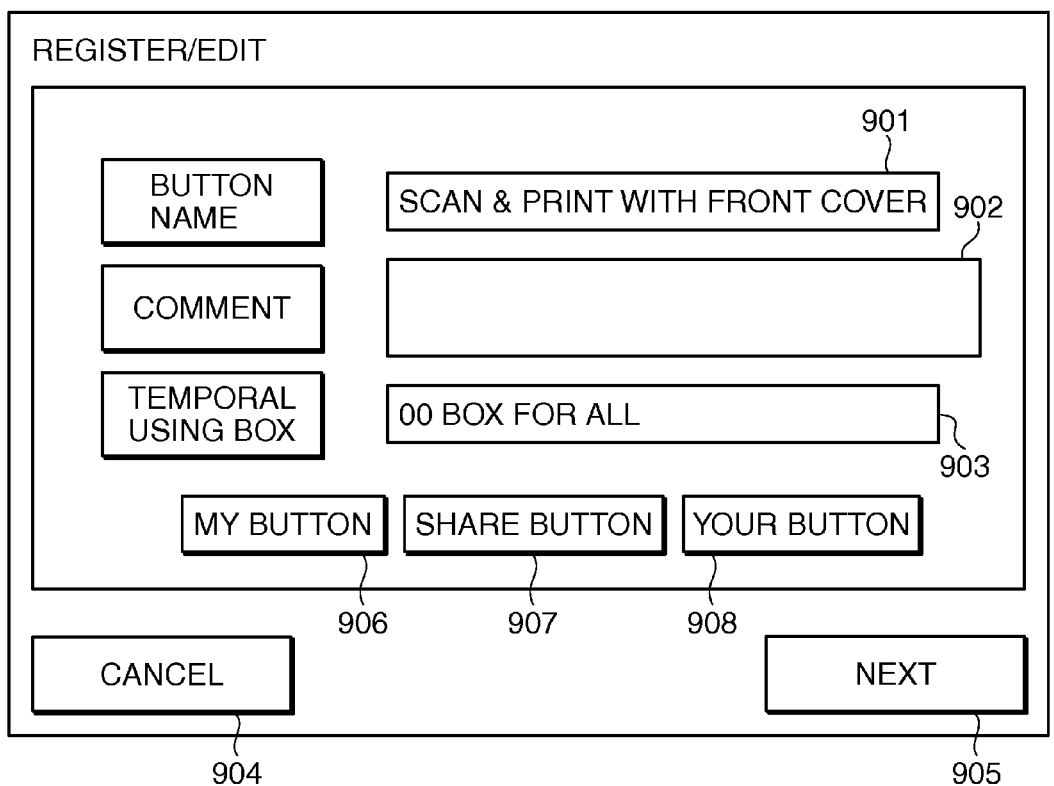
FIG. 11 is a view showing an attribution information registration/edit screen for the process flow that is displayed on the LCD unit by the application according to the first embodiment.

FIG. 11 is a view showing the attribution information registration/edit screen for the process flow that is displayed on the LCD unit 213 by the application according to this embodiment. The attribution information includes a button name field 901, a comment field 902, a temporary use box field 903, a my-button 906, a share-button 907, and a your-button 908. It should be noted that the your-button 908 is displayed only when the your-button generation setting mentioned below is possible.

When the UI module 601 detects that the user pushed the button name field 901 or the comment field 902 in the step S2506, the UI module 601 transmits such a notice to the process-flow edit module 603. Receiving the notice, the process-flow edit module 603 displays a virtual keyboard (not shown) on the LCD unit 213 to allow the user to input text information. The my-button 906, the share-button 907, and the your-button 908 are buttons used to select a registration destination of the process flow. A selection of the registration destination is exclusive and only one button can be selected.

When the UI module 601 detects that the user pushed a cancel button 904 in the step S2506, the UI module 601 transmits such a notice to the process-flow edit module 603.

Receiving the notice, the process-flow edit module 603 displays the process-flow registration/edit basic screen shown in FIG. 10.

When the UI module 601 detects that the user inputted attribute information and then pushed a next button 905 in the step S2506, the UI module 601 transmits such a notice to the process-flow edit module 603. Receiving the notice, the process-flow edit module 603 stores the attribution information about the process flow that was inputted by the user, and the process proceeds to step S2507.

Figure 12:
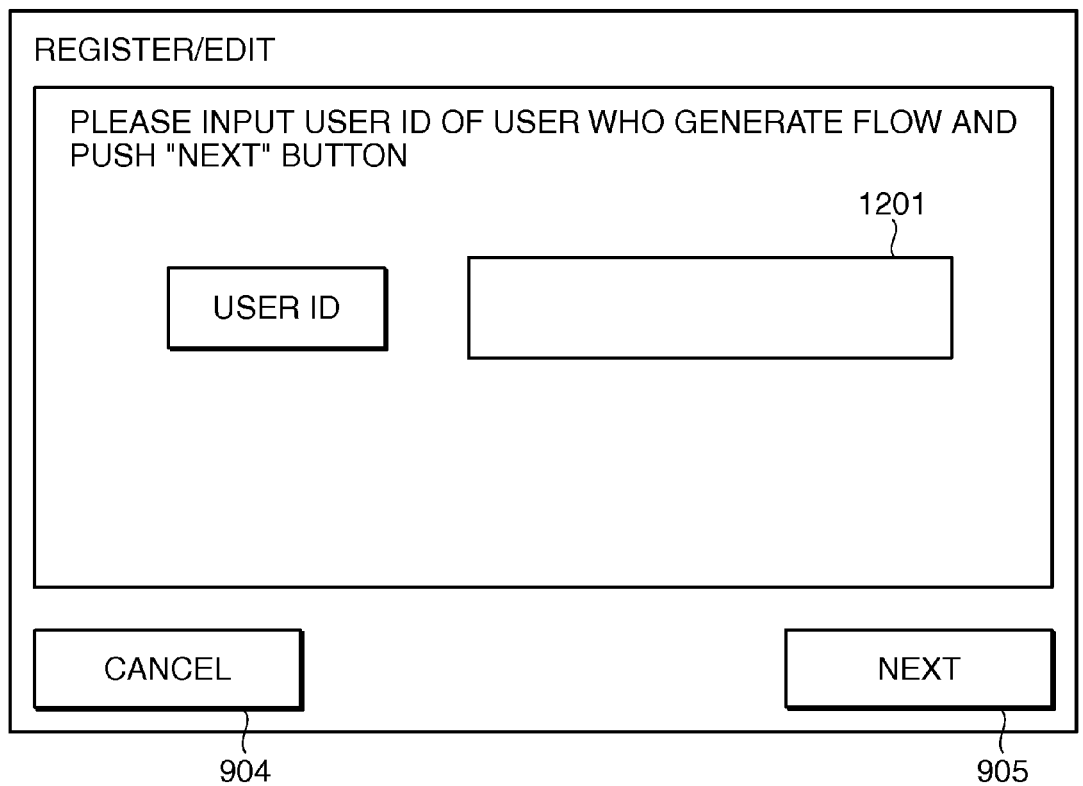
FIG. 12 is a view showing a process-flow registration destination user setting screen that is displayed on the LCD unit by the application according to the first embodiment.
Figure 13:
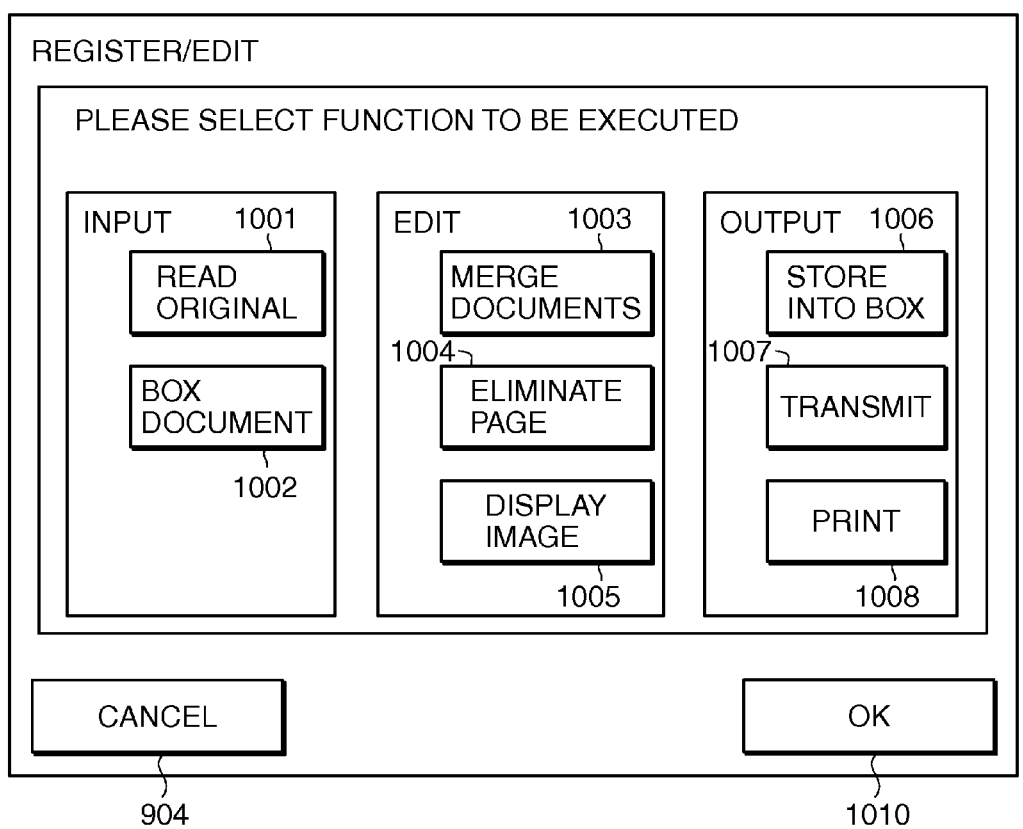
FIG. 13 is a view showing a process-flow function setting screen that is displayed on the LCD unit by the application according to the first embodiment.

In the step S2507, the process-flow edit module 603 determines whether the registration destination is set as the your-button. When the your-button 908 is set, the process proceeds to step S2508 and a screen of FIG. 12 is displayed. When the my-button 906 or the share-button 907 is selected, the process proceeds to step S2510 and a screen of FIG. 13 is displayed. The process-flow edit module 603 displays a process-flow registration destination user setting screen shown in FIG. 12 in the step S2508. Then, the process proceeds to step S2509, and the process-flow edit module 603 receives an input from the user.

FIG. 12 is a view showing the process-flow registration destination user setting screen that is displayed on the LCD unit 213 by the application according to this embodiment. When the UI module 601 detects that the user pushed a user ID field 1201 in the step S2509, the UI module 601 transmits such a notice to the process-flow edit module 603. Receiving the notice, the process-flow edit module 603 displays the virtual keyboard (not shown) on the LCD unit 213 in the step S2509, and receives text information, i.e., process-flow registration destination user ID information, from the user.

When the UI module 601 detects that the user completed the input in the step S2509, the UI module 601 transmits such a notice to the process-flow edit module 603. Receiving the notice, the process-flow edit module 603 stores the process-flow registration destination user ID information received, and the process proceeds to the step S2510.

The process-flow edit module 603 displays a process-flow function setting screen shown in FIG. 13 in the step S2510. Then, the process proceeds to step S2511. In the step S2511, the UI module 601 receives an input from the user.

FIG. 13 is a view showing process-flow function setting screen that is displayed on the LCD unit 213 by the application according to this embodiment. On this screen, an original reading button 1001, a box document button 1002, a document merge button 1003, a page deletion button 1004, an image display button 1005, a store-in-box button 1006, a transmission button 1007, and a print button 1008 are displayed. These buttons are used to display screens on which settings for respective processes concerning an input process, an edit process, and an output process are performed.

When the UI module 601 detects that the user pushed the box document button 1102, for example, in the step S2511, the UI module 601 transmits such a notice to the process-flow edit module 603. Receiving the notice, the process-flow edit module 603 displays a box document process setting screen shown in FIG. 14 and receives an input of a box-document-process setting.

At this time, the process-flow edit module 603 queries the login management module 605 to acquire the access restriction information about the login user. When there is an access restricted function for the user account, the button corresponding to the access restricted function is displayed with shading. Since the UI module 601 does not detect even if the user pushes the button with shading, the user cannot perform a setting of the restricted function.

Figure 14:
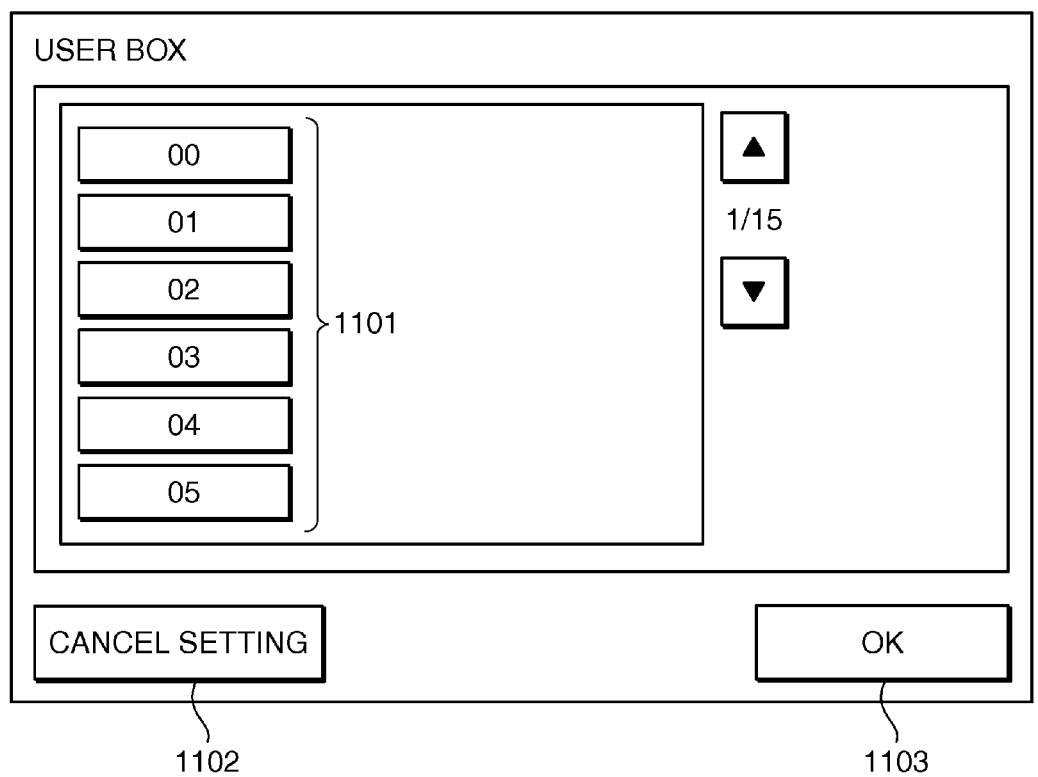
FIG. 14 is a view showing a box document process setting screen that is displayed on the LCD unit by the application according to the first embodiment.

FIG. 14 is a view showing a box document process setting screen that is displayed on the LCD unit 213 by the application according to this embodiment. When the UI module 601 detects that the user selected one of box buttons 1101 in the step S2511, the UI module 601 transmits such a notice to the process-flow edit module 603. Receiving the notice, the process-flow edit module 603 acquires the document information stored in the box area in the HDD 204, displays the information on the LCD unit 213, and makes the user select.

When the UI module 601 detects that the user selected a setting cancel button 1102 in the step S2511, the UI module 601 transmits such a notice to the process-flow edit module 603. Receiving the notice, the process-flow edit module 603 cancels the box document selection information, and displays the process-flow function setting screen shown in FIG. 13.

When the UI module 601 detects that the user selected an OK button 1103 in the step S2511, the UI module 601 transmits such a notice to the process-flow edit module 603. Receiving the notice, the process-flow edit module 603 stores the box document selection information, and displays the process-flow function setting screen shown in FIG. 13.

When the UI module 601 detects that the user pushed the cancel button 904 in the step S2511, the UI module 601 transmits such a notice to the process-flow edit module 603. Receiving the notice, the process-flow edit module 603 cancels the process-flow attribution information stored in the step S2505, the process-flow registration destination user ID information acquired in the step S2509, and user ID list information that will be stored in step S2513 mentioned below. And the registration/edit basic screen shown in FIG. 10 is displayed.

When the UI module 601 detects that the user pushed an OK button 1010 in the step S2511, the UI module 601 transmits such a notice to the process-flow edit module 603. Receiving the notice, the process-flow edit module 603 stores the process-flow function setting information, and the process proceeds to step S2512.

In the step S2512, the process-flow edit module 603 determines a setting of the registration destination of the process flow. When a setting for generating a child user account (mentioned below) is effective, and when the registration destination of the process flow is the share-button or the your-button, the process proceeds to the step S2513, and when the registration destination of the process flow is the my-button, the process proceeds to step S2517.

In the step S2513, the process-flow edit module 603 automatically generates the user ID list information including the user ID of the login user, the password generated by random numbers, and the user account of the registration destination of the flow (the user account inputted in the steps S2508 and S2509). Here, the user accounts of the registration destination of the flow are user accounts inputted in the steps S2508 and S2509. An account of a child user is generated based on the user ID list information. It is assumed that the child user has the same role as the login user and that the contents of the access restriction for the functions of the first copier 101 are equivalent to that of the login user. This user ID list information is called as child user account information.

The process-flow edit module 603 transmits the user ID based on the user ID of the login user, the password generated by the random numbers, and the role information about the login user, to the login management module 605. Next, the login management module 605 transmits the received information to the account information management module 606, and performs an account-generation request.

In step S2514, the login management module 605 waits for the result of the account generation requested from the account information management module 606 in the step S2512. At this time, if there is no reply from the account information management module 606 in a fixed time or if a reply represents failure in the account generation (NO in step S2515), the login management module 605 considers that the account generation failed, and the process proceeds to step S2518. When a reply comes from the account information management module 606 (YES in the step S2515), the login management module 605 considers that the account generation succeeded, and transmits such a notice to the process-flow edit module 603, and the process proceeds to step S2516.

In the step S2516, the process-flow edit module 603 enciphers and stores the user ID and password of the child user that were automatically generated in the step S2513. That is, the child user account information is enciphered and set to the process flow concerned, and the process proceeds to the step S2517. In the step S2517, the process-flow edit module 603 transmits the process-flow attribution information stored in the step S2505 and the process-flow registration destination user ID information stored in the step S2509, to the process-flow management module 602. Further, the process-flow edit module 603 transmits the process-flow function setting information stored in the step S2511 and the enciphered information including the user ID and password of the child user stored in the step S2516, to the process-flow management module 602.

Next, the process-flow management module 602 converts the information received from the process-flow edit module 603 into the XML format and stores it as an XML file into the HDD 204 in the step S2517, and then, the process finishes. In the step S2518, the login management module 605 displays an error message that represents the failure of the process on the UI module 601, and then, the process finishes.

Figure 15:
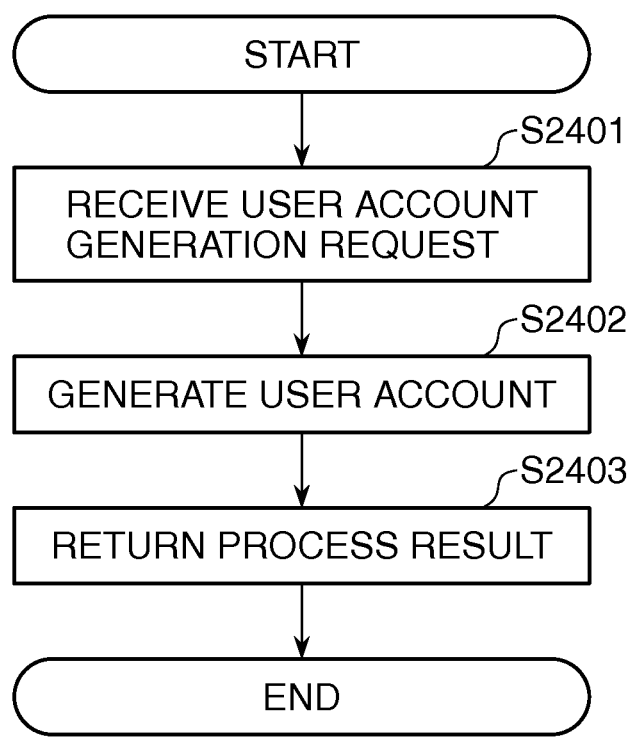
FIG. 15 is a flowchart showing a user account generation process of the application according to the first embodiment.

FIG. 15 is a flowchart showing a user account generation process of the application according to this embodiment.

First, in step S2401, the account information management module 606 receives a user account generation request from the login management module 605, and the process proceeds to step S2402. In the step S2402, the account information management module 606 performs the user account generation process based on the user ID, the password, and the role information that were received from the login management module 605.

In step S2403, the account information management module 606 returns the result of the user account generation process in the step S2402 to the login management module 605.

The above is the description of the process-flow generation process of the application in this embodiment.

Next, a process-flow execution process of the application according to this embodiment will be described with reference to FIG. 16.

Figure 16:
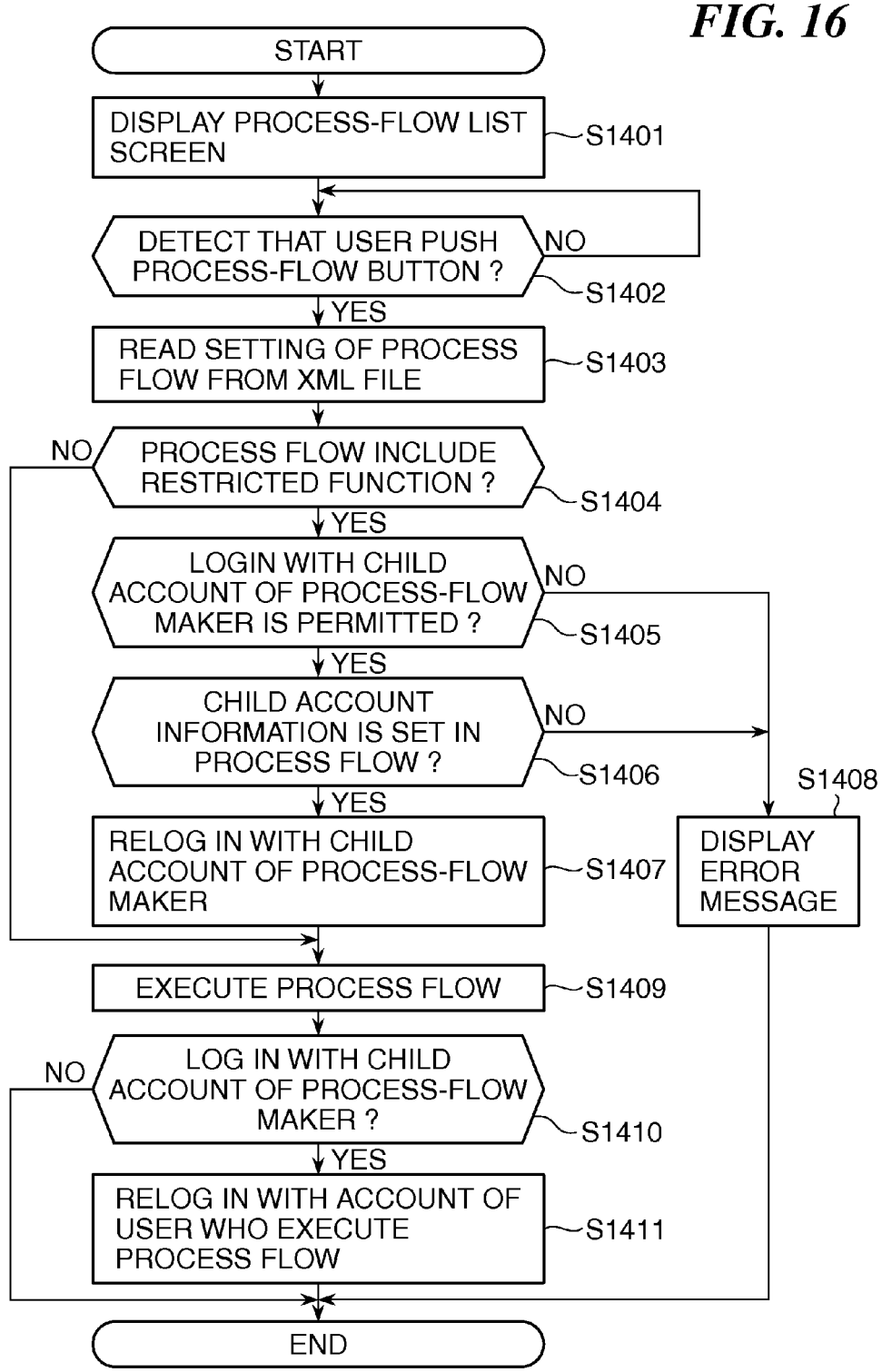
FIG. 16 is a flowchart showing a process-flow execution process of the application according to the first embodiment.

FIG. 16 is a flowchart showing the process-flow execution process of the application according to this embodiment.

The process-flow management module 602 displays the process-flow list screen shown in FIG. 9 in step S1401. Then, the process proceeds to step S1402. In the step S1402, the process-flow management module 602 waits for an input from a user. When the UI module 601 detects that the user pushed the process-flow button in order to instruct an execution of the flow, the UI module 601 transmits such a notice to the process-flow management module 602. Receiving the notice, the process-flow management module 602 stores the process-flow information selected into the HOD 204, and the process proceeds to step S1403.

In the step S1403, the process-flow management module 602 reads the process-flow file (XML file) selected which was stored in the step S1402, from the HDD 204 and analyzes the setting values of the processes that constitute the process flow, and the process proceeds to step S1404. In the step S1404, the process-flow management module 602 determines whether there is any function of which use is restricted in the functions set in the process flow. And when there is a function of which use is restricted, the process proceeds to step S1405. When there is no function of which use is restricted, the process proceeds to step S1409.

In the step S1405, the process-flow management module 602 determines whether login by a child user of the flow maker is permitted. When the login is permitted, the process proceeds to step S1406, and when the login is not permitted, the process proceeds to step S1408. It should be noted that login propriety setting by a child user of the flow maker will be mentioned below.

In the step S1406, the process-flow management module 602 determines whether the information about the child user of the process-flow maker is set in the process flow. When the information is set, the process proceeds to step S1407. When the information is not set, the process proceeds to the step S1408. In the step S1407, the process-flow management module 602 relogs in with the child user account of the process-flow maker set in the process flow and calls the process-flow execution module 604. Then, the process proceeds to the step S1409. Specifically, the login condition with the user account that is used to operate the first copier 101 currently is canceled (i.e., logs off), and logs in using the child user account information that is linked to the flow selected in the step 1402. If the system allows multiple login, the user logs in with the child user account mentioned above in addition to the login with the user account that is used to operate the first copier 101 currently.

In the step S1408, the process-flow management module 602 displays an error message representing that the process flow cannot be executed because there is a function restricted in use among the functions set by the process flow on the LCD unit 213. Then, the process finishes.

In the step S1409, the process-flow execution module 604 executes the function set in the process flow and calls the process-flow management module 602. Then, the process proceeds to step S1410. In the step S1410, the process-flow management module 602 determines whether the user logs in with the child user account of the process-flow maker currently. When the user logs in with the child user account of the process-flow maker, the process proceeds to step S1411. When the user logs in with an account other than the child user account, the process finishes.

In the step S1411, the process-flow management module 602 relogs in with the user account of a person who executes the process flow, and the process finishes. Specifically, the login condition with the child user account is canceled (i.e., logs off), and logs in with the user account that logged off in the step S1407. If the system allows multiple login, the child user account is logged off.

According to the flowchart of FIG. 16, even if the function set in the flow is restricted for the user who logs in, the user can execute the flow by using the authority set to the child account linked to the flow.

In the application of this embodiment, when a process flow registered for another user is eliminated, a child user account set in the eliminated process flow is also eliminated. Next, a process-flow elimination process of the application according to this embodiment will be described with reference to FIG. 17.

Figure 17:
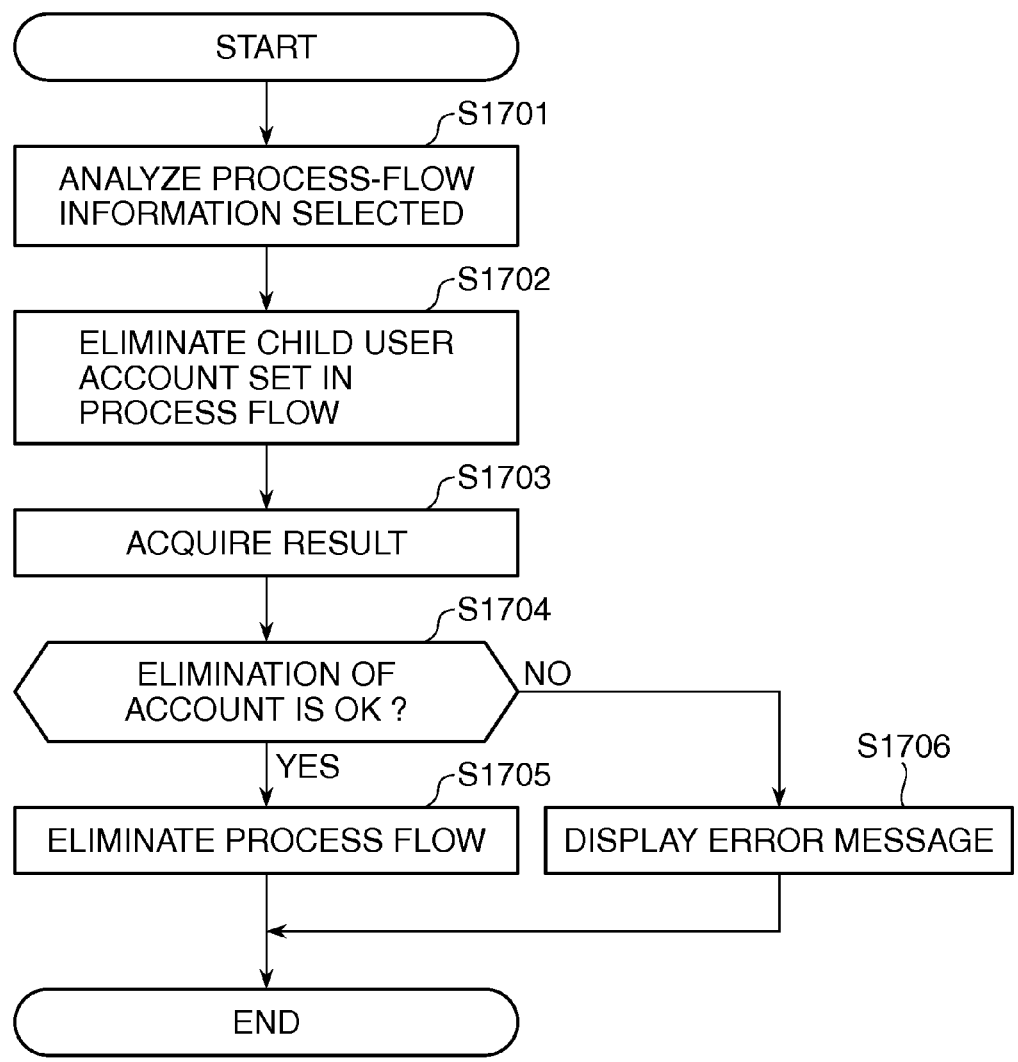
FIG. 17 is a flowchart showing a process-flow elimination process of the application according to the first embodiment.

FIG. 17 is a flowchart showing the process-flow elimination process of the application according to this embodiment.

In the application of this embodiment, when eliminating a process flow registered for another user, a user pushes the registration/edit button 705 in the process-flow list screen of FIG. 9 first. When the UI module 601 detects that the user pushed the registration/edit button 705, the UI module 601 transmits such a notice to the process-flow management module 602. Receiving the notice, the process-flow management module 602 displays the process-flow registration/edit basic screen shown in FIG. 10.

Next, the user selects the your-button indication in the indication selection pull-down 810. When the UI module 601 detects that the user selected the your-button indication in the indication selection pull-down 810, the UI module 601 transmits such a notice to the process-flow management module 602. Receiving the notice, the process-flow management module 602 displays only the information about the process flows registered as the your-button from among the process flows registered in the HDD 204 on the LCD unit 213 in images of buttons.

When the UI module 601 detects that the user selected a button that the user wants to eliminate from among the displayed buttons and pushed the elimination button 808, the UI module 601 transmits such a notice to the process-flow management module 602. Receiving the notice, the process-flow management module 602 stores the process-flow information selected, and executes a process in step S1701 in FIG. 17.

First, in the step S1701, the process-flow management module 602 reads the selected process-flow information from the HDD 204, and analyzes the information set in the process flow. In the next step S1702, the process-flow management module 602 transmits the child user account information set in the process flow to the login management module 605, and requests user account elimination. Next, the login management module 605 passes the account information received from the process-flow management module 602 to the account information management module 606, and requests user account elimination.

In the next step S1703, the login management module 605 waits for a result of the user account elimination requested from the account information management module 606 in the step S1702. At this time, when there is no reply from the account information management module 606 in a fixed time, it is considered that the user account elimination failed. When a reply is received from account information management module 606 within the fixed time, or when the fixed time elapses without receiving a reply, the process proceeds to step S1704.

In the step S1704, the login management module 605 determines the result of the user account elimination request. When the user account elimination succeeded, the login management module 605 transmits such a notice to the process-flow management module 602, and the process proceeds to step S1705. When the user account elimination failed, the process proceeds to step S1706.

In the step S1705, the login management module 605 eliminates the applicable process-flow file from the HDD 204 with reference to the stored process-flow information specified by the user, and the process finishes. In the step S1706, the login management module 605 displays an error message that represents the failure of the user account elimination, and then, the process finishes.

Figure 18:
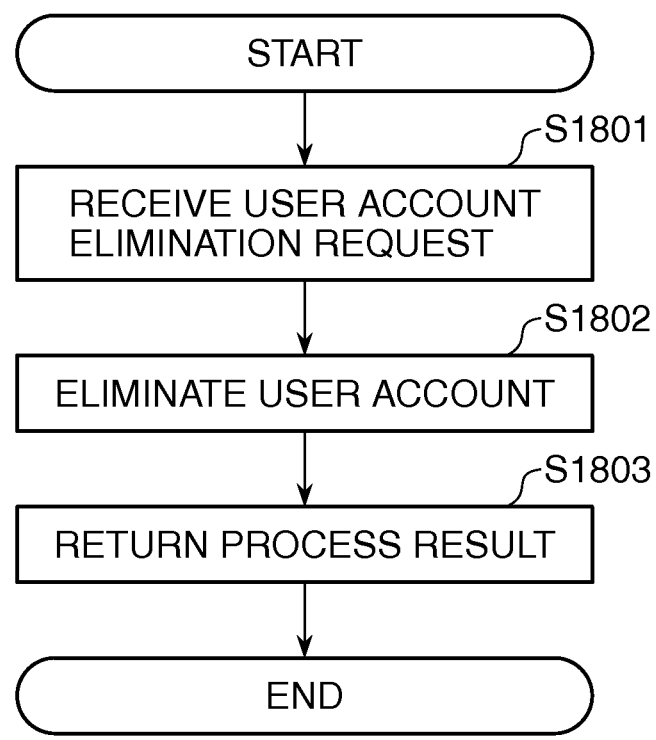
FIG. 18 is a flowchart showing a user account elimination process by an account information management unit in FIG. 3.

FIG. 18 is a flowchart showing a user account elimination process by the account information management unit 606.

First, in step S1801, the account information management module 606 receives a user account elimination request from the login management module 605, and the process proceeds to step S1802. In the step S1802, the account information management module 606 performs the elimination process for the information corresponding to the user account information received from the login management module 605. In the next step S1803, the account information management module 606 transmits a result of the user account elimination process in the step S1802 to the login management module 605.

In the application of this embodiment, even if a process flow is registered as a my-button, when the process flow is registered by another user (a your-button of another user), it is impossible to check, edit, replicate, and eliminate the contents of the process flow. Hereafter, a process-flow edit process of the application according to this embodiment, when the process flow is registered as a my-button, will be described with reference to FIG. 19.

Figure 19:
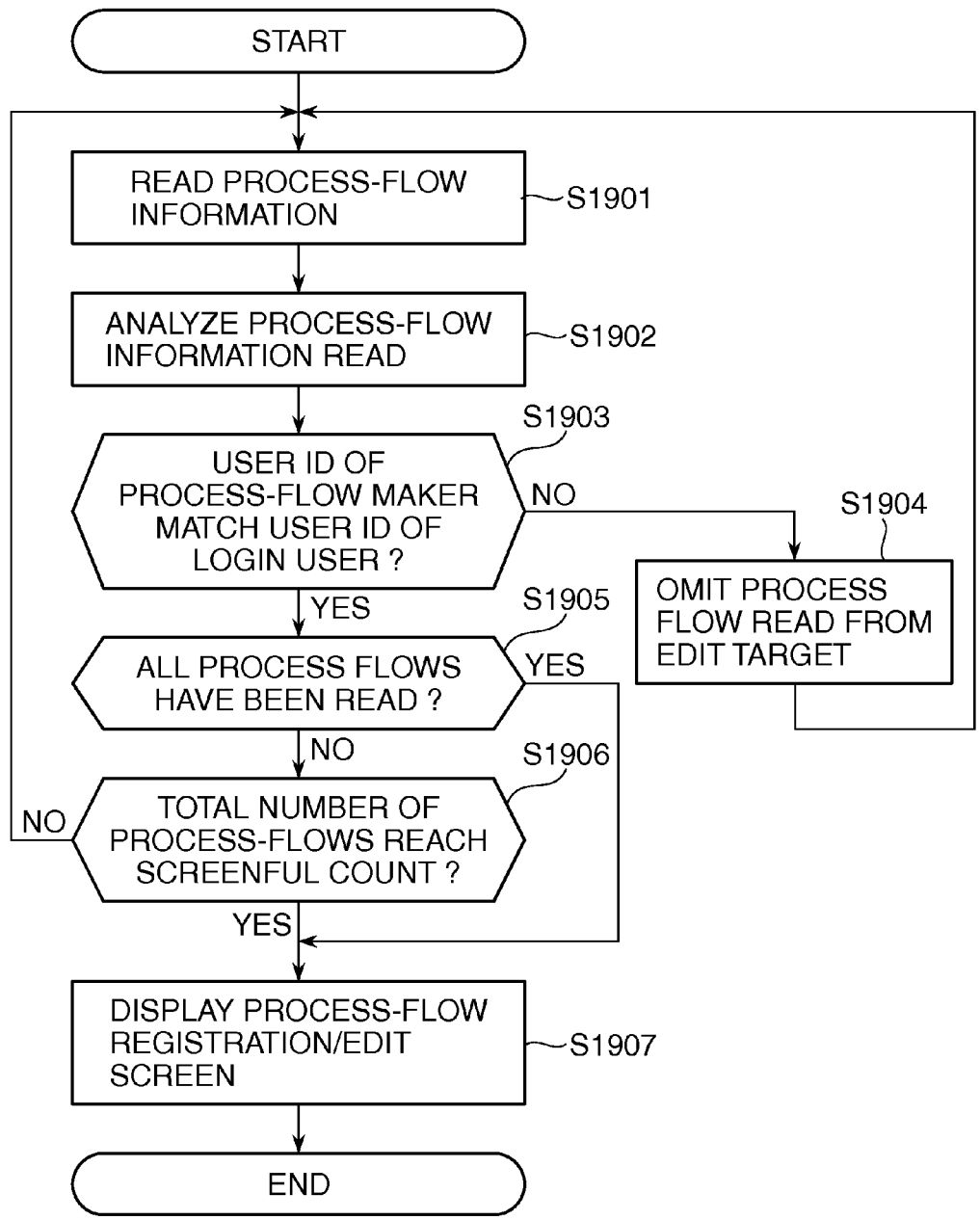
FIG. 19 is a flowchart showing a process-flow registration/edit screen generation process of the application according to the first embodiment.

FIG. 19 is a flowchart showing a process-flow registration/edit screen generation process of the application according to this embodiment.

In the application of this embodiment, when editing a process flow registered as a my-button, a user pushes the registration/edit button 705 in the process-flow list screen of FIG. 9 first. When the UI module 601 detects that the user pushed the registration/edit button 705, the UR module 601 transmits such a notice to the process-flow management module 602. Receiving the notice, the process-flow management module 602 displays the process-flow registration/edit basic screen shown in FIG. 10.

Next, the user selects the your-button indication in the indication selection pull-down 810. When the UI module 601 detects that the user selected the your-button indication in the indication selection pull-down 810, the UI module 601 transmits such a notice to the process-flow management module 602. Receiving the notice, the process-flow management module 602 performs a process in step S1901 in FIG. 19.

In the step S1901, the process-flow management module 602 reads one process flow registered in the HDD 204. The process-flow management module 602 analyzes the process-flow read in the step S1901. Then, the process proceeds to step S1903.

In the step S1903, the process-flow management module 602 determines whether the user ID of the process-flow maker is coincident with that of the current login user. When the user IDs are coincident, the read process-flow information is stored, and the process proceeds to step S1905. When the user IDs are different, the process proceeds to step S1904. It should be noted that in the process in the step S1903, it may be determined whether a child account is set in the process flow or not. In that case, if the child account is set, the process proceeds to the step S1904. If the child account is not set, the process proceeds to the step S1905.

In the step S1904, the process-flow management module 602 returns to the step S1901 without editing the process-flow information read in the step S1901, and reads the next process flow.

In the step S1905, the process-flow management module 602 determines whether all the process flows registered in the HDD 204 have been read. When all the process flows have been read, the process proceeds to step S1907. When any process flow that has not been read yet remains, the process proceeds to step S1906.

In the step S1906, the process-flow management module 602 determines whether the total number of the process flows, which has been read and stored, reached a screenful count. When the total number of the process flows reached the screenful count, the process proceeds to the step S1907.

When the total number of the process flows did not reach the screenful count, the process returns to the step S1901 and the next process flow is read.

In the step S1907, the process-flow management module 602 displays the process-flow registration/edit basic screen of FIG. 10 that includes the process flow buttons 801 as symbols of the process flows that are read and stored.

Since the process flow button registered by another user is no longer displayed even if the button is the my-button of the login user by the above process, it becomes impossible to check, edit, replicate, and eliminate the contents of the process flow. That is, an authority to edit, replicate, and eliminate the process flow that was generated as the process flow of another user can be restricted to only the user who generated the process flow concerned.

Figure 20:
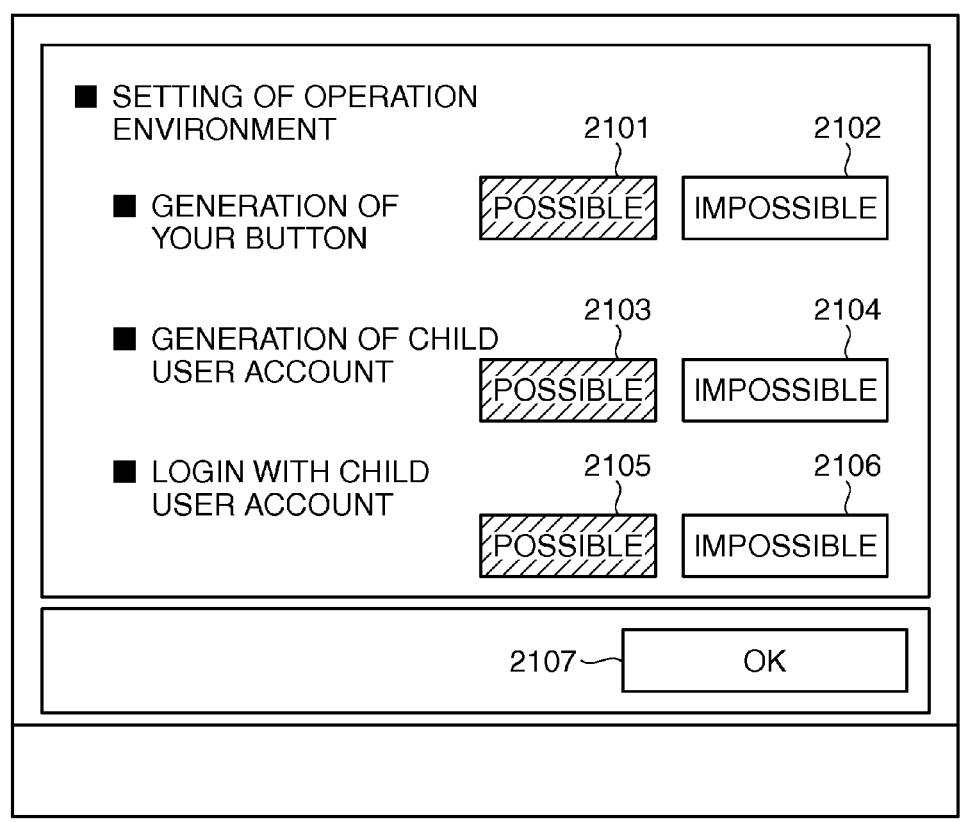
FIG. 20 is a view showing an operation setting change screen that is displayed on the LCD unit by the application according to the first embodiment.

The application of this embodiment allows an operation setting to change behavior of the application under operating conditions. FIG. 20 is a view showing an operation setting change screen for the application according to this embodiment.

As shown in FIG. 20, a user can set three items including a generation of a your-button, a generation of a child user account, and a login with a child user account. On this screen, possible buttons 2101, 2103, and 2105, impossible buttons 2102, 2104, and 2106 are displayed for the respective items.

The item of generation of the your-button is set up to determine whether the your-button 908 is displayed in the process in the step S2505. That is, this item sets up to determine whether a process flow generated by a login user is registered as a process flow of another user.

The item of generation of the child user account is set up to determine whether the child user account is automatically generated in the step S2512. The item of login with the child user account is set up to determine whether the user automatically logs in with the child user account in the step S1405. That is, this item is set up to determine whether another user automatically relogs in with the child user account set in the process flow when the other user tries to execute the process flow registered as the button of the other user concerned.

Figure 21:
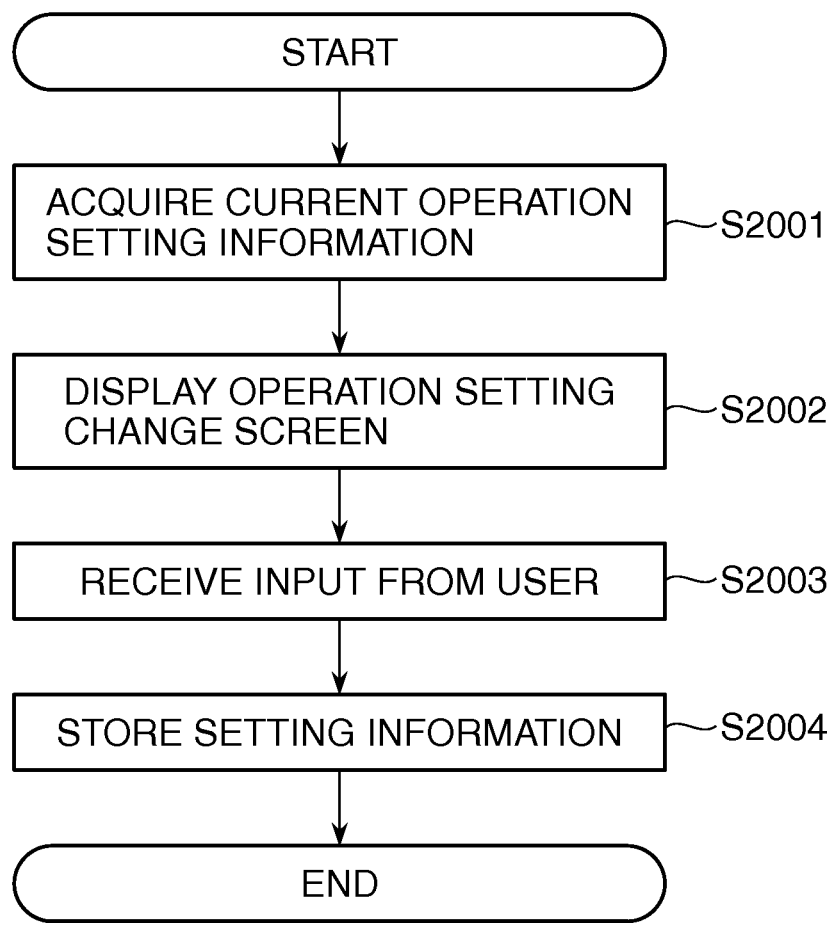
FIG. 21 is a flowchart showing an operation setting change process of the application according to the first embodiment.

FIG. 21 is a flowchart showing an operation setting change process of the application according to this embodiment.

First, in step S2001, the process-flow management module 602 acquires current operation setting information from the HDD 204, and the process proceeds to step S2002. In the step S2002, the process-flow management module 602 displays the operation setting change screen shown in FIG. 20 in which the buttons corresponding to the effective settings are highlighted among the buttons 2101 through 2106 reflecting the setup information acquired in the step S2001, and the process proceeds to step S2003.

In the step S2003, the process-flow management module 602 receives an input from a user. When the UI module 601 detects that the user pushed one of the buttons 2101 through 2106, the UI module 601 transmits such a notice to the process-flow management module 602. Receiving the notice, the process-flow management module 602 stores the information about the button selected by the user and highlights the button concerned. When the UI module 601 detects that the user pushed an OK button 2107, the UI module 601 transmits such a notice to the process-flow management module 602. When the process-flow management module 602 receives the notice, the process proceeds step S2004.

In the step S2004, the process-flow management module 602 stores the setup information stored in the step S2003 into the HDD 204, and the process finishes.

According to this embodiment, only a process flow that is permitted (generated) by an authorized user can be performed by a user who does not have authority to execute the process. That is, even if access restriction information is not changed, device function that is prohibited from accessing can be used only for a process of a predetermined procedure. Therefore, even if an access to the image processing apparatus is restricted, a task can be transferred easily, which improves user's convenience.

In a second embodiment, a process by which a user under login condition restricts other users who can be selected as registration destinations of process flows will be described.

An application execution environment and an application configuration are similar to that of the first embodiment.

Next, a process-flow generation process of the application according to the second embodiment will be described with reference to FIG. 22, FIG. 23, etc.

Figure 22:
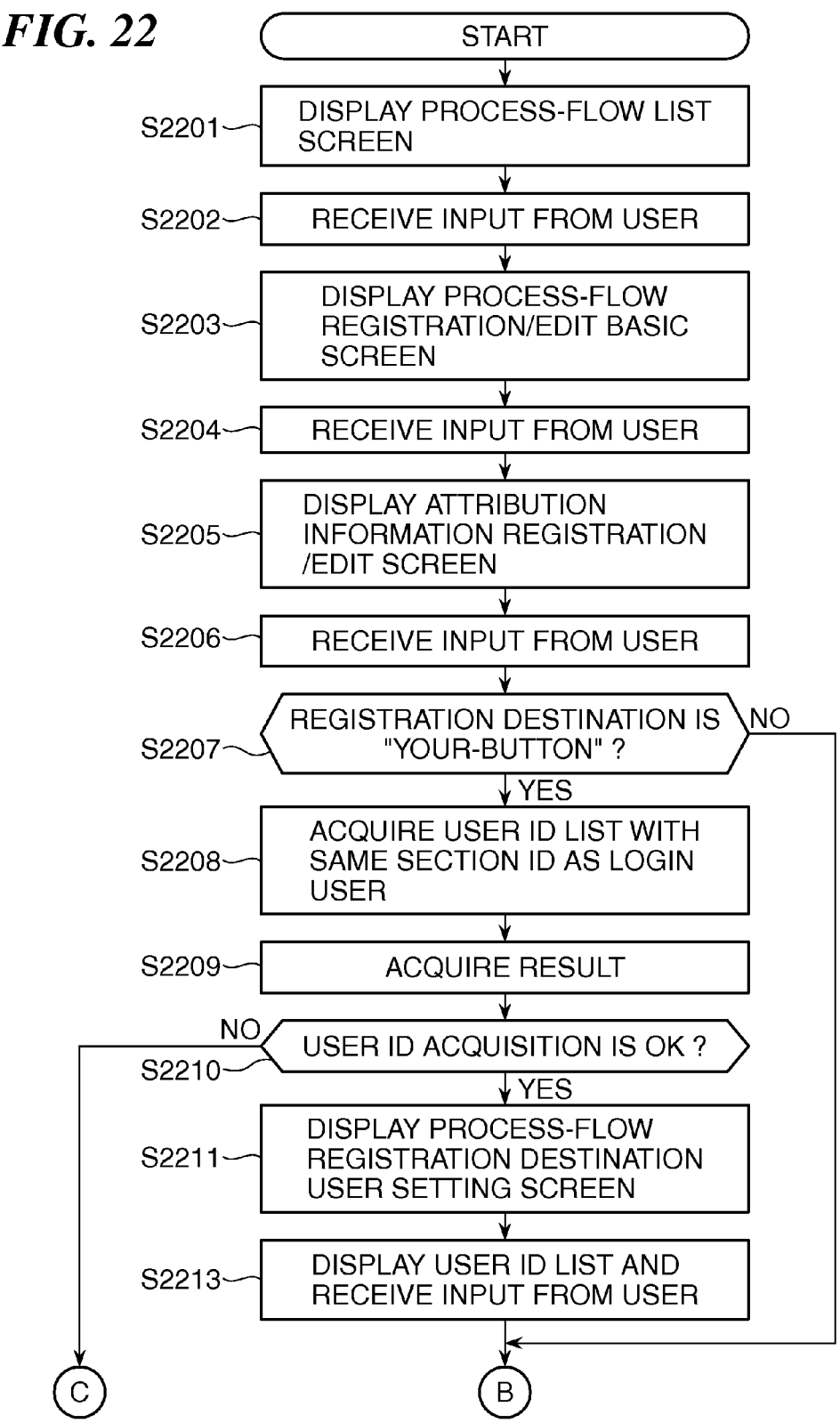
FIG. 22 is a flowchart showing a first half of a process-flow generation process of an application according to a second embodiment.
Figure 23:
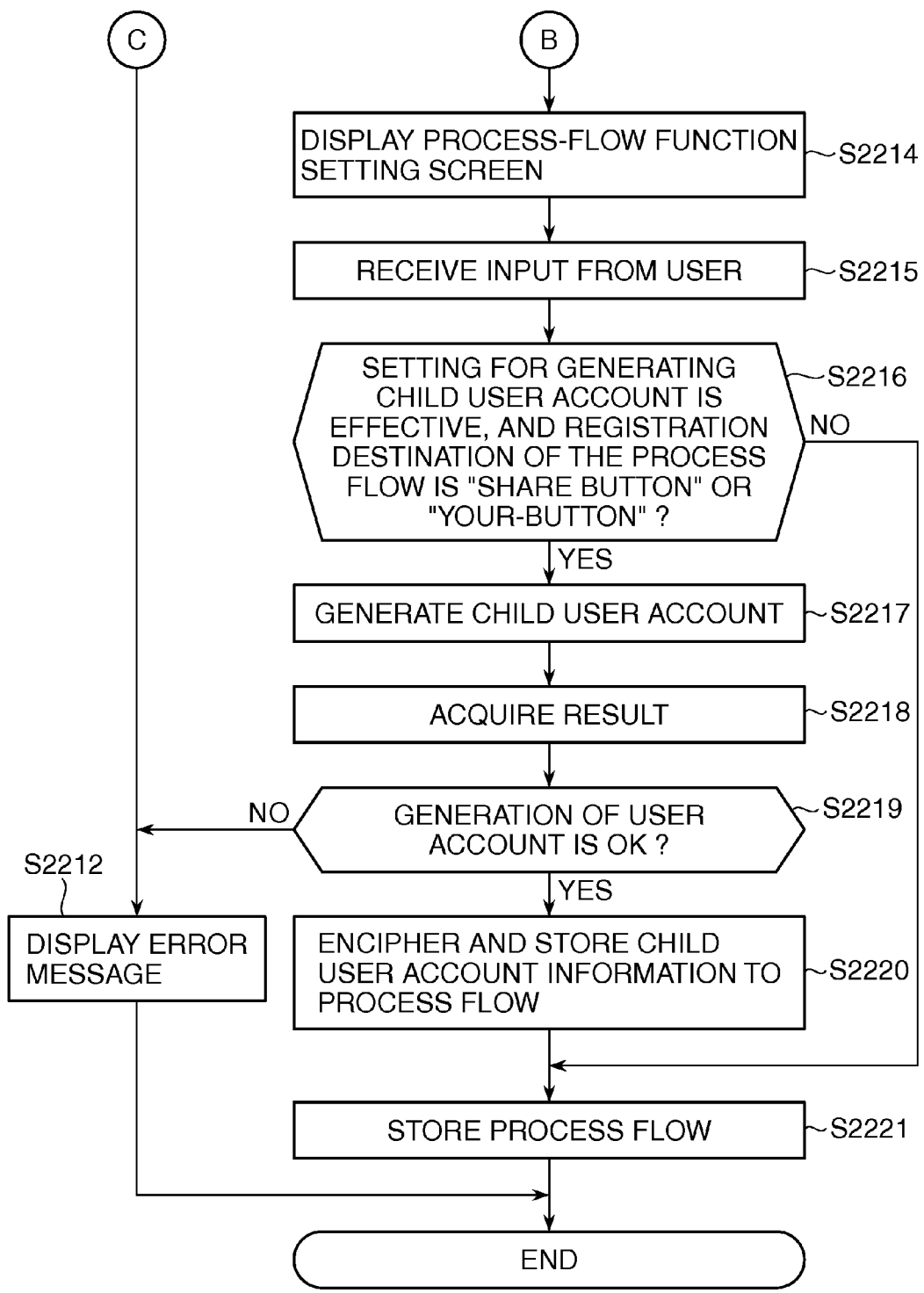
FIG. 23 is a flowchart showing a second half of the process-flow generation process of the application according to the second embodiment.

FIG. 22 and FIG. 23 are flowcharts showing the process-flow generation process of the application according to the second embodiment.

The process from step S2201 to step S2207 is the same as the process from the step S2501 to the step S2507 in FIG. 7 in the above-mentioned first embodiment. In the step S2207, the process-flow edit module 603 determines the setting of the registration destination of the buttons. At this time, when the your-button 908 is selected in the screen of FIG. 11 mentioned above, the process proceeds to step S2208 and the screen of FIG. 12 is displayed. When the my-button 906 or the share-button 907 is selected, the process proceeds to step S2214 and the screen of FIG. 13 is displayed.

In the step S2208, the process-flow edit module 603 passes a section ID of a login user to the login management module 605, and then, the login management module 605 passes the section ID to the account information management module 606, and acquires the user ID list with the same section ID as the login user.

In the next step S2209, the process-flow edit module 603 waits for the result of user ID list acquisition with the same section ID as the login user who requested from the account information management module 606 in the step S2208. At this time, the login management module 605 determines that the user ID list acquisition failed, when there is no reply from the account information management module 606 in a fixed time. When the reply is received from account information management module 606 within the fixed time, or when the fixed time elapses without receiving a reply, the process proceeds to step S2210.

In the next step S2210, the login management module 605 determines the result of the user ID list acquisition. When the user ID list acquisition succeeded, the user ID list information is transmitted to the process-flow edit module 603, and the process proceeds to step S2211. When the user list acquisition failed, the process proceeds to step S2212.

The process-flow edit module 603 displays the process-flow registration destination user setting screen shown in FIG. 12 in the step S2211. Then, the process proceeds to step S2213 in which an input from a user is received. FIG. 12 is a view also showing the process-flow registration destination user setting screen in the second embodiment. When the UI module 601 detects that the user pushed the user ID field 1201 shown in FIG. 12, the process proceeds to the step S2213. In the step S2213, the process-flow edit module 603 displays the information about the user ID list acquired in the step S2208 in a list, and allows the user to select one user ID freely.

When the UI module 601 detects that the user pushed the cancel button 904 in the step S2213, the UI module 601 transmits such a notice to the process-flow edit module 603. Receiving the notice, the process-flow edit module 603 cancels the process-flow attribution information stored in the step S2205 and the user ID list information acquired in the step S2208, and displays the process-flow registration/edit basic screen of FIG. 10.

When the UI module 601 detects that the user selected one of the user IDs displayed as the list and pushed the next button 905 in the step S2213, the UI module 601 transmits such a notice to the process-flow edit module 603. Receiving the notice, the process-flow edit module 603 stores the process-flow registration destination user ID information received, and the process proceeds to the step S2214.

The process-flow edit module 603 displays the process-flow function setting screen shown in FIG. 13 in the step S2214. Then, the process proceeds to step S2215. In the step S2215, an input from the user is received by the function of the UI module 601.

The process from step S2216 to step S2221 is the same as the process from the step S2512 to the step S2518 in FIG. 8 in the above-mentioned first embodiment.

Next, a generation process of the above-mentioned user ID list will be described.

Figure 24:
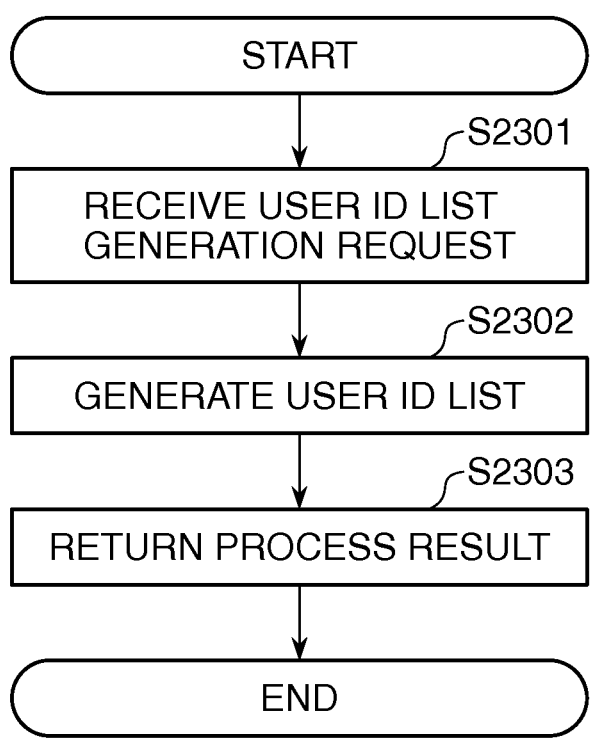
FIG. 24 is a flowchart showing a user ID list generation process of the application according to the second embodiment.

FIG. 24 is a flowchart showing a user ID list generation process of the application according to this embodiment.

First, in step S2301, the account information management module 606 receives a user ID list generation request from the login management module 605, and the process proceeds to step S2302. In the step S2302, the account information management module 606 retrieves a user ID of which the section ID agrees with the section ID received from the login management module 605, and generates a list.

In the next step S2303, the account information management module 606 returns the result of the user ID list generation process in the step S2302 to the login management module 605.

According to the second embodiment, a user under login condition can restrict other users who can be selected as registration destinations of process flows.

It should be noted that although an account of which a section ID agrees with the section ID of the login user becomes the registration target for the your-button in the second embodiment, the account of the registration target may be defined by another condition.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-066187, filed on Mar. 18, 2009, which is hereby incorporated by reference herein in its entirety.

What is claimed is:

1. An image processing apparatus having a plurality of functions comprising:

a function restriction unit adapted to restrict execution of a function of the image processing apparatus based on restriction information for restricting use of the function of the image processing apparatus, the restriction information being set for each user;

an authentication unit adapted to authenticate a user who operates the image processing apparatus according to a user account of the user who operates the image processing apparatus;

a process-flow generation unit adapted to generate a process that is achieved by combining a plurality of functions provided by the image processing apparatus as a process flow according to an instruction from a first user who is authenticated by said authentication unit, wherein the process flow includes at least one function that is execution-restricted with respect to an instruction from a second user, and wherein the process flow is associated with information for allowing the process flow to be executed in response to the instruction from the second user; and an execution unit adapted to execute the process flow based on an instruction from the first user or the second user.

2. The image processing apparatus according to claim 1, further comprising an account generation unit adapted to generate a child account linked to the user account of the user who is authenticated by said authentication unit, wherein the child account is the information for allowing the process flow to be executed in response to the instruction from the second user, and wherein the process flow generated by said process-flow generation unit is associated with the child account generated by said account generation unit so as to link to the user account of the first user.

3. The image processing apparatus according to claim 2, further comprising a relogin unit adapted to relog in with the child account automatically when the second user issues an execution instruction to said execution unit to execute the process flow.

4. The image processing apparatus according to claim 2, further comprising:

a storage unit adapted to store the process flow and the child account associated with the process flow; and an elimination unit adapted to eliminate the child account stored in association with the process flow automatically, when the process flow stored in said storage unit is eliminated.

5. The image processing apparatus according to claim 1, further comprising an instruction restriction unit adapted to restrict instructions from a user other than the first user to edit, replicate, and eliminate with respect to the process flow stored by said storage unit.

6. The image processing apparatus according to claim 1, further comprising an account restriction unit adapted to restrict an account of a user who is allowed to issue an execution instruction with respect to the process flow stored by said storage unit according to the user account of the first user.

7. A control method for an image processing apparatus that has a plurality of functions and is provided with a function restriction unit to restrict execution of a function of the image processing apparatus based on restriction information, which is set for each user, for restricting use of the function of the image processing apparatus, the control method comprising:

an authentication step of authenticating a user who operates the image processing apparatus according to a user account of the user who operates the image processing apparatus;

a process-flow generation step of generating a process that is achieved by combining a plurality of functions provided by the image processing apparatus as a process flow according to an instruction from a first user who is authenticated in said authentication step, wherein the process flow includes at least one function that is execution-restricted with respect to an instruction from a second user, and wherein the process flow is associated with information for allowing the process flow to be executed in response to the instruction from the second user; and an execution step of executing the process flow based on an instruction from the first user or the second user.

8. A non-transitory computer-readable storage medium storing a computer-executable control program configured to control an image processing apparatus that has a plurality of functions at least to restrict execution of a function of the image processing apparatus based on restriction information, which is set for each user, for restricting use of the function of the image processing apparatus, the program comprising:

authentication instructions configured to authenticate a user who operates the image processing apparatus according to a user account of the user who operates the image processing apparatus;

process-flow generation instructions configured to generate a process that is achieved by combining a plurality of functions provided by the image processing apparatus as a process flow according to an instruction from a first user who is authenticated according to said authentication instructions, wherein the process flow includes at least one function that is execution-restricted with respect to an instruction from a second user, and wherein the process flow is associated with information for allowing the process flow to be executed in response to the instruction from the second user; and execution instructions configured to execute the process flow based on an instruction from the first user or the second user.

* * * * *